United States Patent
Shyamsundar et al.

(10) Patent No.: US 10,353,560 B2
(45) Date of Patent: Jul. 16, 2019

(54) DEBUGGING A FLOW

(71) Applicant: Microsoft Technology Licensing, LLC, Redmond, WA (US)

(72) Inventors: Balasubramanian Shyamsundar, Redmond, WA (US); Daniel Joseph Kappes, Redmond, WA (US); Jesse D. Francisco, Woodinville, WA (US); Joon Y. Chung, Redmond, WA (US); Stephen Siciliano, Bellevue, WA (US); Merwan Vishnu Hade, Seattle, WA (US); Nitish Kumar Meena, Seattle, WA (US); Himanshu Agrawal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 15/358,752

(22) Filed: Nov. 22, 2016

(65) Prior Publication Data

US 2017/0315714 A1    Nov. 2, 2017

Related U.S. Application Data

(60) Provisional application No. 62/329,154, filed on Apr. 28, 2016.

(51) Int. Cl.
*G06F 3/0482* (2013.01)
*G06T 1/20* (2006.01)
(Continued)

(52) U.S. Cl.
CPC ........ *G06F 3/04847* (2013.01); *G06F 3/0482* (2013.01); *G06F 16/9038* (2019.01);
(Continued)

(58) Field of Classification Search
CPC .................................. G06F 8/35; G06F 3/048
(Continued)

(56) References Cited

U.S. PATENT DOCUMENTS 8,098,389 B2    1/2012  Matoba et al.
8,468,124 B2    6/2013  Bonanno et al.
(Continued)

OTHER PUBLICATIONS

Viticci, Federico, "Workflow Review: Integrated Automation for iOS 8", Published on: Dec. 11, 2014, Available at: https://www.macstories.net/reviews/workflow-review-integrated-automation-for-ios-8/, 13 pages.

(Continued)

*Primary Examiner* — Cao H Nguyen
(74) *Attorney, Agent, or Firm* — Fiala & Weaver P.L.L.C.

(57) ABSTRACT

Methods, systems, apparatuses, and computer program products are provided for developing, debugging, and growing workflows. Embodiments enable the developer to test the workflow in place in a workflow designer that displays input/output parameter values for each workflow step during the test run. The developer is enabled to toggle the workflow step(s) between a development mode, where the developer may edit input parameter values, and a test mode, where the developer is displayed (but cannot edit) the input parameter values and is displayed the output parameter values at each workflow step. A record of workflow runs of a workflow is also maintained. The developer is also enabled to transition a workflow from being a business application to a robust software application having additional functionality. The workflow logic generated is transported between a visual workflow designer and a full-blown code editor.

20 Claims, 16 Drawing Sheets

(51) Int. Cl.
    *G06Q 10/06* (2012.01)
    *G06F 3/0484* (2013.01)
    *G06F 16/9038* (2019.01)

(52) U.S. Cl.
    CPC ....... *G06Q 10/067* (2013.01); *G06Q 10/0633* (2013.01); *G06T 1/20* (2013.01)

(58) Field of Classification Search
    USPC .................................................. 715/763–765
    See application file for complete search history.

(56) References Cited

U.S. PATENT DOCUMENTS

| | | | |
|---|---|---|---|
| 9,170,821 | B1 | 10/2015 | Palaniappan et al. |
| 2006/0074732 | A1 | 4/2006 | Shukla et al. |
| 2006/0195817 | A1 | 8/2006 | Moon |
| 2006/0288332 | A1 | 12/2006 | Sagar et al. |
| 2007/0156485 | A1 | 7/2007 | Sanabria et al. |
| 2009/0070162 | A1 | 3/2009 | Leonelli et al. |
| 2009/0112673 | A1 | 4/2009 | McCrady et al. |
| 2011/0225565 | A1 | 9/2011 | van Velzen et al. |
| 2011/0258579 | A1 | 10/2011 | Nanjundaswamy |
| 2012/0254825 | A1* | 10/2012 | Sharma ............... G06F 8/34 717/101 |
| 2017/0235848 | A1* | 8/2017 | Van Dusen ......... H04L 41/04 705/12 |

OTHER PUBLICATIONS

"Workflow Tips for Beginners", Published on: Dec. 17, 2014, Available at: http://sayzlim.net/workflow-tips-beginners/, 8 pages.

Pramono, Eric, "8 Reasons to Love the New Workflow App for iOS", Published on: Dec. 11, 2014, Available at: http://www.geekswithjuniors.com/note/8-reasons-to-love-the-new-workflow-app-for-ios.html, 17 pages.

Pepermans, Benoît, "Workflow automation for all iOS", Published on: Dec. 21, 2014, Available at: https://slice42.com/tests/tests-iphone-ipad-ipod/2014/12/workflow-lautomatisation-ios-pour-tous-8678/, 18 pages.

"Developing a Custom Workflow Activity", Retrieved on: May 2, 2016, Available at: https://www.neudesic.com/neuron/Help3/Development/Samples_and_Walkthroughs/Workflow_Samples/Developing_a_Custom_Workflow_Activity.htm, 4 pages.

"How Zapier Works", Published on: Jul. 8, 2014, Available at: https://zapier.com/help/how-zapier-works/, 3 pages.

"Creating a Zap", Retrieved on: May 2, 2016, Available at: https://zapier.com/help/creating-zap/, 15 pages.

"Navigating the Zap Editor", Retrieved on: May 2, 2016, Available at: https://zapier.com/learn/how-to-use-zapier/zap-editor/, 7 pages.

"Walkthrough: Creating and Debugging a SharePoint Workflow Solution", Published on: May 25, 2010, Available at: https://msdn.microsoft.com/en-us/library/ee231573.aspx, 7 pages.

"Creating Workflow Models", Published on: Mar. 5, 2015, Available at: https://docs.adobe.com/docs/en/cq/5-6-1/workflows/create-models.html, 9 pages.

"Specialized Debugging Workflows", Retrieved on: May 2, 2016, Available at: https://developer.apple.com/library/ios/documentation/DeveloperTools/Conceptual/debugging_with_xcode/chapters/special_debugging_workflows.html#//apple_ref/doc/uid/TP40015022-CH9-SW1, 16 pages.

"International Search Report and Written Opinion Issued in PCT Application No. PCT/US2017/029503", dated Jun. 7, 2017, 11 Pages. (MS# 359948-WO-PCT).

* cited by examiner

Browser Window 402

Send an email when a file is added to the Drafts folder

| Status | Start Time | Duration |
|---|---|---|
| ⊖ Failed | 3/11/2016 1:37 PM | 2 sec |
| ⊖ Failed | 3/1/2016 12:25 PM | 2 sec |
| ⊘ Succeeded | 2/28/2016 3:45 PM | 2 sec |
| ⊘ Succeeded | 2/27/2016 1:27 PM | 2 sec |
| ⊘ Succeeded | 2/26/2016 11:25 AM | 2 sec |
| ⊘ Succeeded | 2/25/2016 12:40 PM | 2 sec |
| ⊘ Succeeded | 2/24/2016 2:25 PM | 2 sec |

FIG. 20

DEBUGGING A FLOW

CROSS REFERENCE TO RELATED APPLICATIONS

This application claims the benefit of U.S. Provisional Application No. 62/329,154, filed on Apr. 28, 2016, titled "Visualization of the Created Flow for Debugging," which is incorporated by reference herein in its entirety.

BACKGROUND

A business or enterprise application is a computer program used by business users to perform various business functions. Business applications are frequently developed when available off-the-shelf software does not completely address the desired functionality. Many business applications are interactive, having a graphical user interface (GUI) into which users can input data, use to submit data queries, use to perform operations, and/to use to view results. Consumer applications are less business focused, instead being focused on the needs of the consumer.

Business and consumer users tend to depend on information technology (IT) personnel to code their applications due to application complexity, and the programming expertise required. Even merely designing an application to pull data from a remote source (e.g., a cloud service) is difficult, typically requiring an experienced software developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for developing user applications that include workflows, and in particular, for developing workflows that access any number of available services to receive information, may include any number of conditions that are resolved based on the received information, may perform any number of actions based on the received information and conditions, and generate workflow results based on the combination of accessed services and conditions.

In one implementation, a method in a computing device for visualizing results of a workflow run is described. In accordance with the method, a visual representation of a workflow is rendered by displaying each workflow step of the workflow in sequence in a graphical user interface (GUI) of a workflow designer. One or more workflow steps of the workflow are transitioned from a development mode to a test mode in the GUI. A test workflow run is executed on the one or more workflow steps transitioned to the test mode using input parameters applied to the one or more workflow steps. For each of the one or more workflow steps transitioned to the test mode, parameter values for at least one input used and at least one output parameter generated during the test workflow run are displayed in the visual representation.

In another implementation, a system in a computing device for visualizing results of a workflow run is described. The system includes at least one processor circuit and at least one memory that stores program code configured to be executed by the at least one processor circuit. The program code includes a user interface generator configured to render a visual representation of a workflow by displaying each workflow step of the workflow in sequence in a graphical user interface (GUI) of a workflow designer. The program code also includes a workflow tester configured to transition one or more workflow steps of the workflow from a development mode to a test mode in the GUI. and execute a test workflow run on the one or more workflow steps transitioned to the test mode using input parameters applied to the one or more workflow steps. The user interface generator is further configured to display in the visual representation, for each of the one or more workflow steps transitioned to the test mode, parameter values for at least one input used and at least one output parameter generated during the test workflow run.

In still another implementation, a method in a computing device for developing a workflow is described. In accordance with the method, a selection of workflow steps is received by a user for inclusion in a workflow at a first workflow development application, the workflow steps selected from a workflow library that stores program code defining each of the workflow steps. A visual representation of the workflow that includes the selected workflow steps is rendered in a graphical user interface (GUI) displayed by a display screen of the computing device. The GUI is generated by the first workflow development application. The GUI displayed the visual representation of the workflow shows controls representative of parameters of the workflow steps without displaying the program code defining the workflow steps. The workflow is saved to generate saved workflow logic containing program code that defines the workflow. The saved workflow logic is loaded in a second workflow development application capable of displaying and editing the program code defining the workflow to generate a software application that comprises different functionality than the workflow.

In another implementation, a system for developing a workflow is described. The system includes at least one processor circuit and at least one memory that stores program code configured to be executed by the at least one processor circuit. The program code includes a first workflow development application configured to receive a selection of workflow steps by a user for inclusion in a workflow, the workflow steps selected from a workflow library that stores program code defining each of the workflow steps, render a visual representation of the workflow that includes the selected workflow steps in a graphical user interface (GUI) displayed by a display screen of the computing device, the GUI displaying the visual representation of the workflow showing controls representative of parameters of the workflow steps without displaying the program code defining the workflow steps, and save the workflow to generate saved workflow logic containing program code that defines the workflow. The program code also includes a second workflow development application configured to load the saved workflow logic, and display and edit the program code of the saved workflow logic defining the workflow to generate a software application that comprises different functionality that the workflow.

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 20 shows a block diagram view of a GUI screen displayed to a developer in response to the developer activating an input control, according to an example embodiment.

Figure 1:
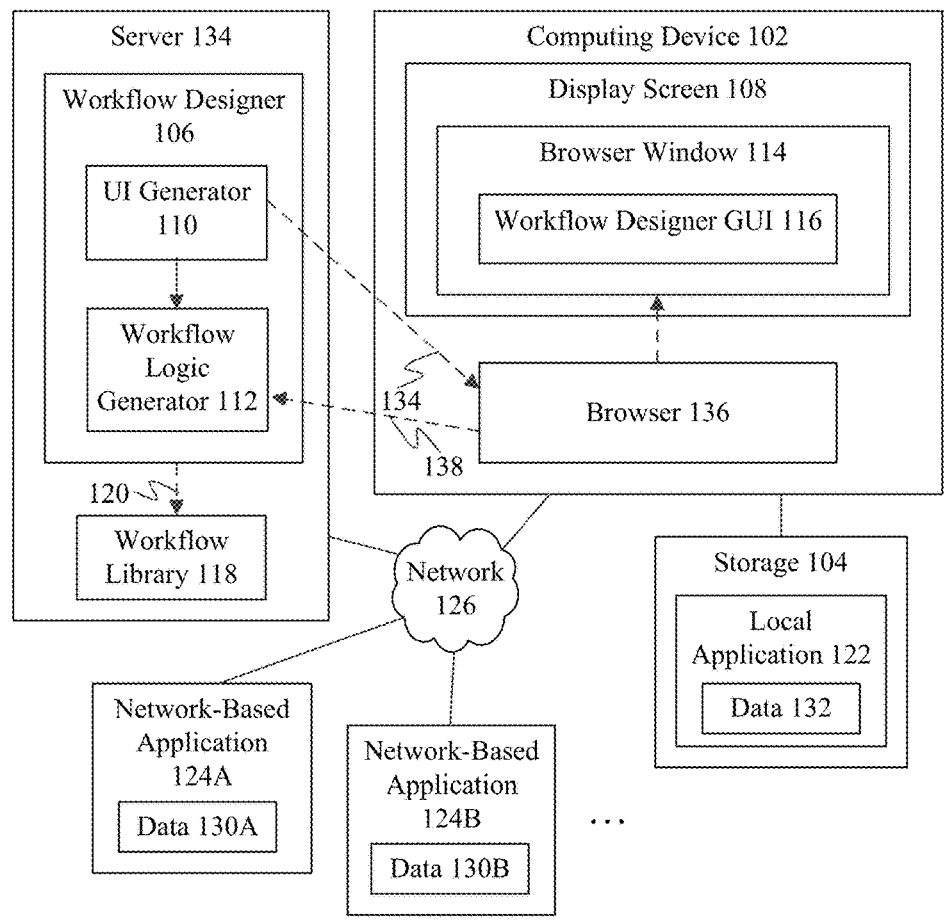
FIG. 1 shows a workflow development system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Development of Workflows

Business applications and consumer applications typically are created when available off-the-shelf software does not completely address the desired functionality. Many business and consumer applications are interactive, having a graphical user interface (GUI) into which users can input data, use to submit data queries, use to perform operations, and/to use to view results.

Users tend to depend on information technology (IT) personnel to code their applications due to application complexity and the programming expertise required. For instance, configuring an application to pull data from a source of interest to enterprises or consumers (e.g., data from an SQL (structured query language) database, customer relationship information from Salesforce.com of San Francisco, Calif., social network information from Facebook® operated by Facebook, Inc. of Palo Alto, Calif., or Twitter® operated by Twitter, Inc. of San Francisco, Calif.) is a difficult process.

Embodiments enable easier development of user applications, including business applications and consumer applications. Developers are enabled to develop user applications in the form of workflows without having to be expert programmers.

Example embodiments are described in the following sections for development of user application workflows. In the following description, a person that develops a user application using the techniques described herein is referred to as a "developer," to be distinguished from a person that uses the user application at runtime (a "user" or "end user"). It is noted, however, that a "developer," as referred to herein, does not need to have expertise in computer programming. The embodiments described herein enable application development without special programming skills.

A. Example Workflow Development Embodiments

Development of workflows may be enabled in various ways in embodiments. For instance, FIG. 1 shows a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Workflow designer 106 includes a user interface (UI) generator 110 and a workflow logic generator 112. Computing device 102 includes a display screen 108 and a browser 136. Storage 104 stores a local application 122. System 100 is described as follows.

Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows created by workflow designer 106 during runtime of those workflows. Local application 122 may be any type of local application/service, such as a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, also referred to as "cloud" applications or services. Network-based applications 124A and 124B are accessible by computing device 102 over network 126, may be configured to perform data processing and/or data hosting operations, and may provide data 130A and 130B, respectively, to workflows created by workflow designer 106 during runtime of those workflows. Network-based applications 124A and 124B may each be any type of web accessible applications/services, such as database applications, social networking applications, messaging applications, financial services applications, news applications, search applications, web-accessible productivity applications, cloud storage and/file hosting applications, etc. Examples of such applications include a web-accessible SQL (structured query language) database, Salesforce.com™, Facebook®, Twitter®, Instagram®, Yammer®, LinkedIn®, Yahoo! ® Finance, The New York Times® (at www.nytimes.com), Google search, Microsoft® Bing, Google Docs™, Microsoft® Office 365, Dropbox™, etc. Although FIG. 1 shows two network-based applications, any number of network-based applications may be accessible over network 126, including numbers in the tens, hundreds, thousands, or greater numbers.

Note that data 130A, data 130B, and data 132 may each include any type of data, including messages, notifications, calculated data, retrieved data, and/or any other type of information requested or usable by a workflow.

Computing device 102 and server 134 may each include at least one network interface that enables communications with each other and with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Workflow designer 106 is configured to be operated/interacted with to create workflows. For instance, a developer may access workflow designer 106 by interacting with an application at computing device 102 capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow.

As shown in FIG. 1, workflow designer 106 includes UI generator 110 and workflow logic generator 112. UI generator 110 is configured to transmit workflow GUI information 140 (e.g., one or more web pages, image content, etc.) to browser 136 to be displayed as workflow designer GUI 116 in display screen 108 in browser window 114. Workflow designer GUI 116 may be interacted with by the developer to select and configure workflow steps into a workflow. For example, the developer may insert and sequence a plurality of workflow steps in workflow designer GUI 116, with one or more of the steps being associated with a local or network-based application. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked at runtime by an end user.

During runtime of the workflow, workflow logic 120 may invoke operation of one or more local or network-based applications associated with the workflow steps of workflow logic 120. Each workflow step may receive input data from workflow designer GUI 116, data 132 from local application 122, data 130A or data 130B from one or both of local or network-based applications 124A and 124B, and/or data from another workflow step of workflow logic 120.

Figure 2:
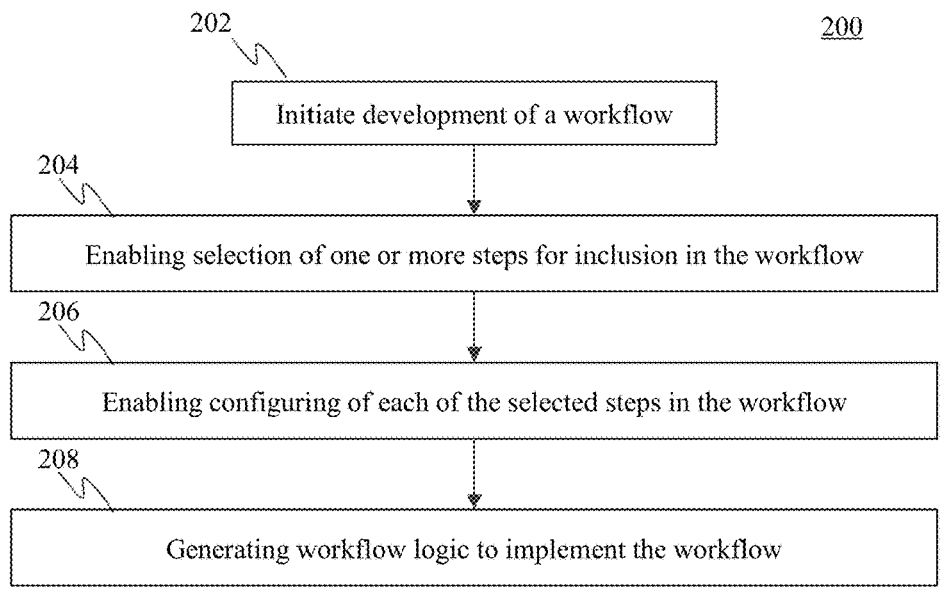
FIG. 2 shows a flowchart providing a process for development of workflows, according to an example embodiment.
Figure 3:
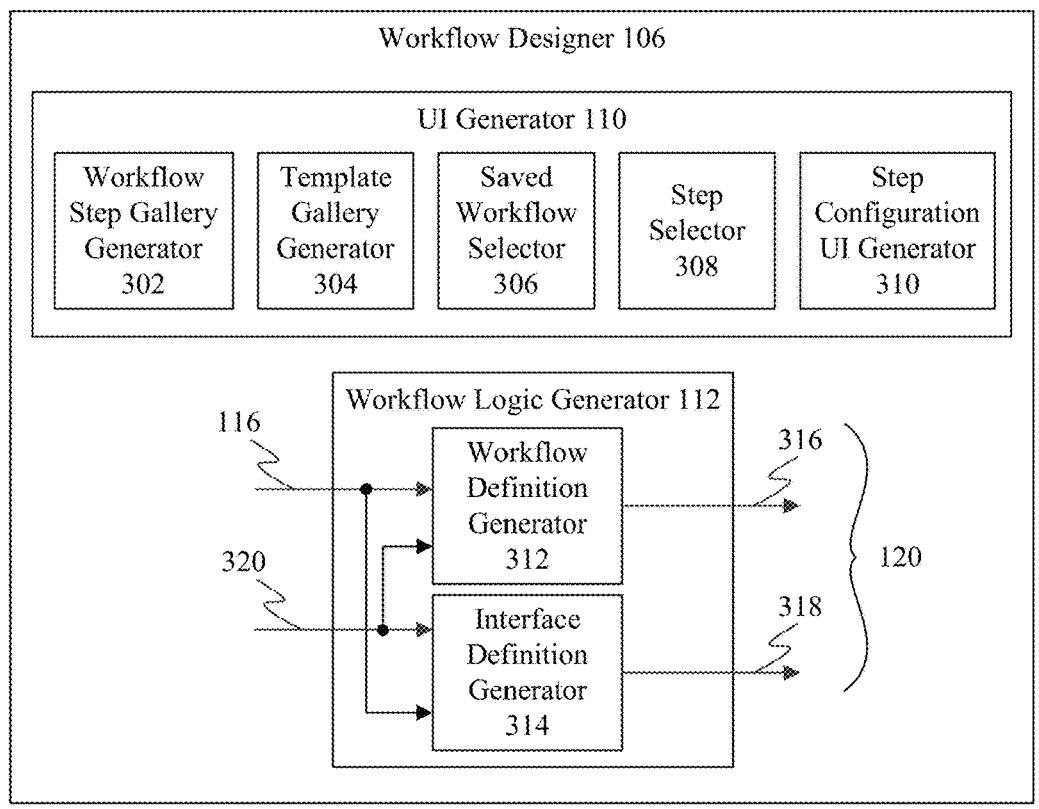
FIG. 3 shows a block diagram of a workflow designer application, according to an example embodiment.
Figure 4:
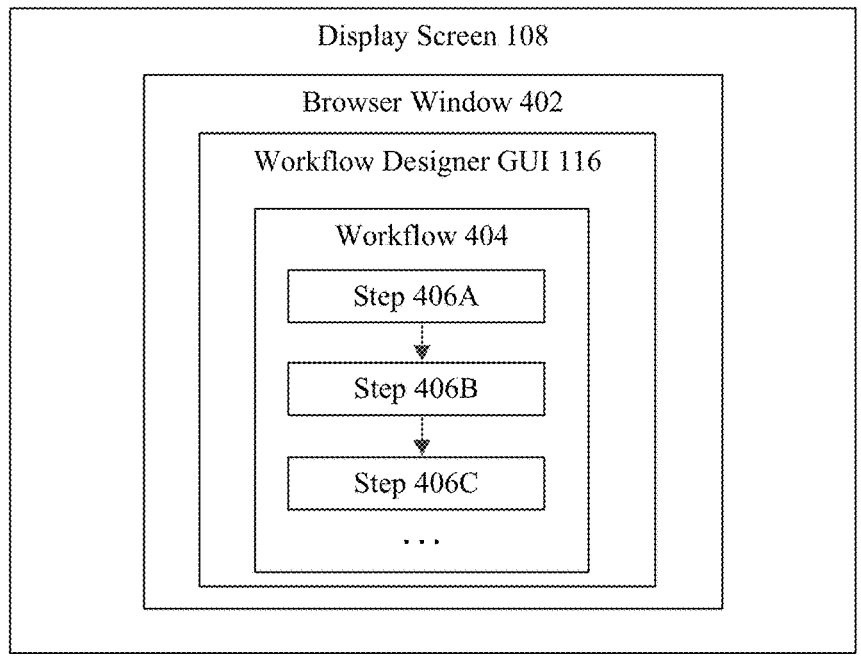
FIG. 4 shows a block diagram of a display screen showing a browser window displaying an exemplary workflow, according to an example embodiment.

Workflow designer 106 may operate in various ways, to enable development of a workflow. For instance, in embodiments, workflow designer 106 may operate according to FIG. 2. FIG. 2 shows a flowchart 200 providing a process for development of workflows, according to an example embodiment. Flowchart 200 and workflow designer 106 are described as follows with respect to FIGS. 3 and 4. FIG. 3 shows a block diagram of workflow designer 106, according to an example embodiment. As shown in FIG. 3, workflow designer 106 includes UI generator 110 and workflow logic generator 112. UI generator 110 includes a workflow step gallery generator 302, a template gallery generator 304, a saved workflow selector 306, a step selector 308, and a step configuration UI generator 310. Workflow logic generator 112 includes a workflow definition generator 312 and an interface definition generator 314. FIG. 4 shows a block diagram of display screen 108, illustrating an example of workflow designer GUI 116 displayed in browser window 402 on display screen 108, according to an example embodiment.

Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin a new workflow.

For instance, a displayed page of workflow designer GUI 116 may display a gallery or workflow steps generated by workflow step gallery generator 302. The workflow step gallery includes a plurality of selectable workflow steps. The workflow steps may be stored in workflow library 118, and accessed for display by workflow designer GUI 116. The developer may select one of the workflow steps for inclusion in their workflow, and may proceed with configuring the contents of the workflow step, and/or may add additional workflow steps to continue generating their workflow.

For example, as shown in FIG. 4, workflow step gallery generator 302 may enable steps 406A, 406B, and 406C to be selected for insertion into a workflow 404 being assembled in workflow designer GUI 116. Any number of workflow steps may be inserted.

In another example, a displayed page of workflow designer GUI 116 may display a template gallery generated by template gallery generator 304. The template gallery includes a plurality of selectable workflow templates, which each include one or more workflow steps pre-connected for operation. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, step 406C may have been subsequently added (e.g., from a workflow step gallery).

In another example, saved workflow selector 306 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, and/or may add additional workflow steps to the workflow steps of the workflow to generate a more complex workflow.

In step 204, selection of one or more steps for inclusion in the workflow is enabled. When a developer is editing a workflow, step selector 308 may enable the developer to select further workflow steps for inclusion in the workflow, and to order the steps. The workflow steps may be accessed by step selector 308 in workflow library 118. For instance, step selector 308 may display a pull-down menu of workflow steps, a scrollable and/or searchable list of available workflow steps, or may provide the workflow steps in another manner, and may enable the developer to select any number of workflow steps from the list for inclusion in the workflow.

In one example, step selector 308 may enable a developer to select a step that is associated with a local application, such as Microsoft® Outlook®, or a network-based application, such as Facebook®. Step selector 308 enables the steps to be chained together in a sequence, optionally with conditional steps, for inclusion in workflow logic 120.

In step 206, each of the selected steps in the workflow is enabled to be configured. In an embodiment, step configuration UI generator 310 enables configuration of each workflow step in a workflow. Step configuration UI generator 310 accesses each selected workflow step in workflow library 118 to determine the configuration of the workflow step, including all of its input parameters and any other selections or information that a user or developer needs to provide to the workflow step to configure it For example, step configuration UI generator 310 may generate a UI that enables the developer to type, navigate to, use a pull-down menu, or otherwise enter input data into a text input box or other data input element (e.g., input parameter) of a workflow step. The developer may configure an output of a prior step to be input data for a workflow step. Step configuration UI generator 310 may enable data or other objects to be copied and pasted, dragged and dropped, or otherwise entered copied from elsewhere into data input boxes of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the necessary inputs and outputs (parameters) of the workflow step, such that a service may be accessed according to the API definition. In such an implementation, the operations in the workflow definition information 316 refer to the corresponding API metadata in the interface definition information 318 to give a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 shows views of an exemplary workflow in various phases of development using a development GUI, according to example embodiments. For example, each of FIGS. 5-8 show browser window 402 displaying a corresponding view of workflow designer GUI 116 being used to develop a workflow.

Figure 5:
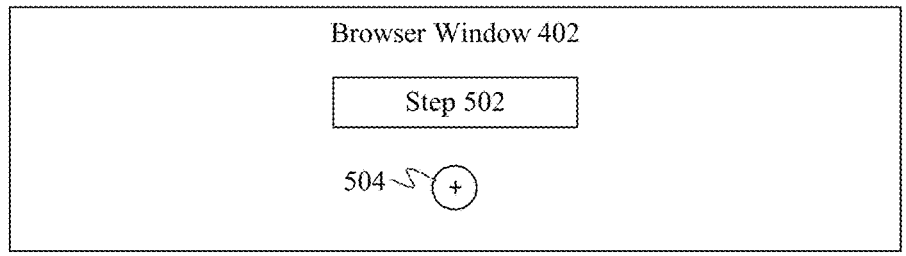
FIGS. 5-8 shows views of an exemplary workflow in various phases of development using a development GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a gallery of workflow steps, a template gallery, or elsewhere. A list, library, or gallery may include any number of workflow steps. The workflow steps may be associated with network-based applications mentioned elsewhere herein or otherwise known (e.g., Dropbox™), and/or with local applications mentioned elsewhere herein or otherwise known (e.g., Microsoft® Outlook®). Each workflow step is configured for plug-and-place into the workflow. Each workflow step is configured with the appropriate logic and/or interface(s) to perform its respective function(s), which may include communicating with a local or remote application. For instance, a workflow step may be configured to transmit a query to an application (e.g., a search query to a search engine, a database query to a database, a request for data from a social networking application, etc.), being pre-configured how to properly transmit and format such a request to the application. The workflow step may be configured to receive a response to the request, being pre-configured how to parse the response for desired response data. As such, a developer of a workflow does not need to know how to write program code in a programming language, to interface with complex application interfaces (e.g., application programming interfaces (APIs)), or to understand network communication protocols, as the workflow steps are already setup. When a workflow step is plugged into workflow logic by a developer, the developer configures the inputs to the workflow step (as described below), and the otherwise pre-configured workflow step handles any communications with other applications.

Figure 6:
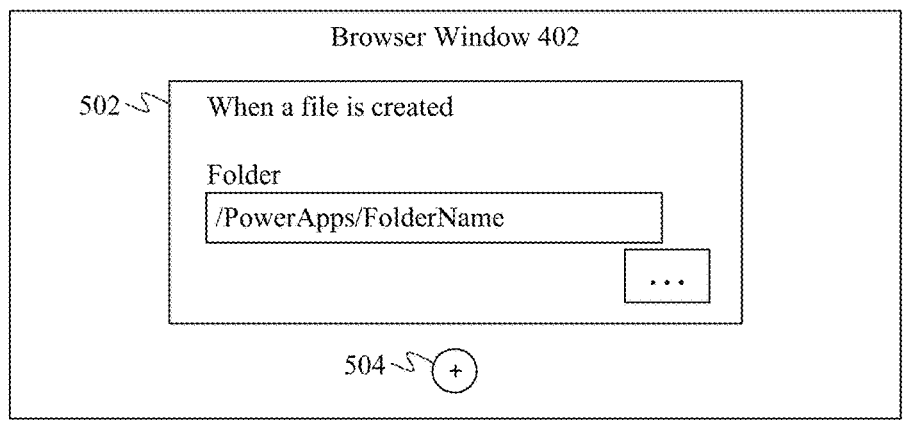

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to monitor for a file to be created in a particular folder identified by the developer in a text input box (e.g., by typing, clicking on a navigator indicated by " . . . ", etc.). When workflow step 502 determines a file is added to the indicated folder, a workflow step following workflow step 502 is triggered. Thus, workflow step 502 may be considered a trigger step in this example.

Figure 7:
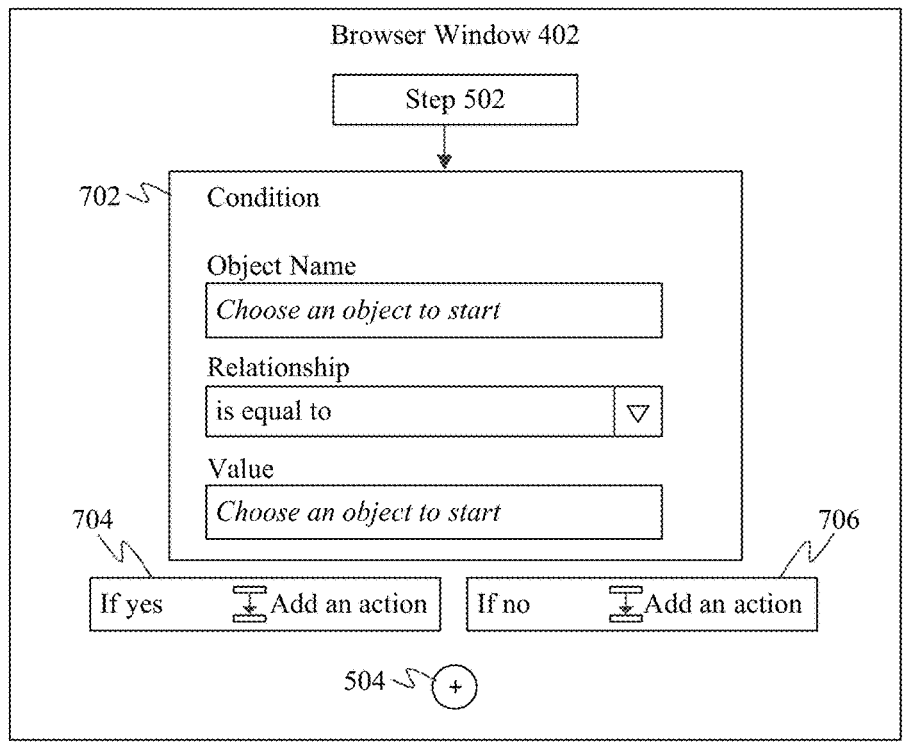

For instance, in FIG. 7, the developer interacted with add interface 504 to select a next workflow step 702. In an embodiment, interaction with add interface 504 invokes step selector 308 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

In one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
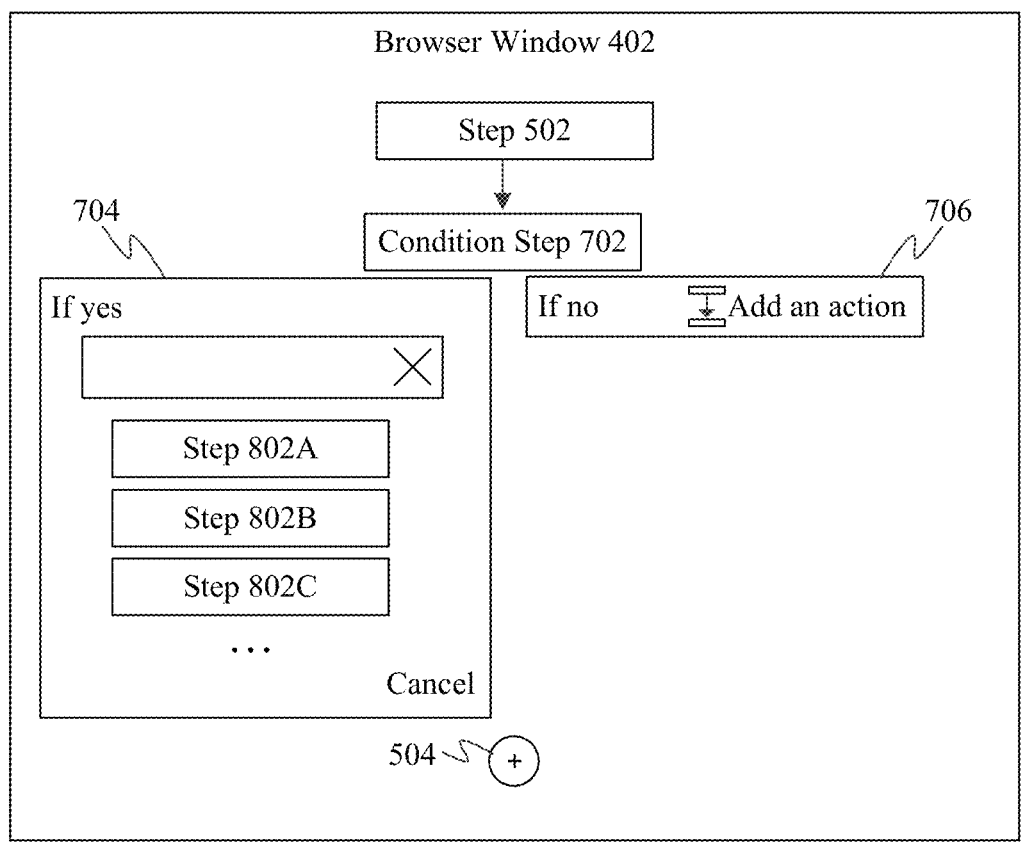

For example, in FIG. 8, the developer interacts with action workflow step 704 to define an action. In this example, the developer is defining action workflow step 704 by selecting a workflow step via step selector 308. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

B. Example Runtime Embodiments

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more applications, local or network-accessible, as was configured by the developer. Accordingly, the workflow performs its intended functions.

Figure 9:
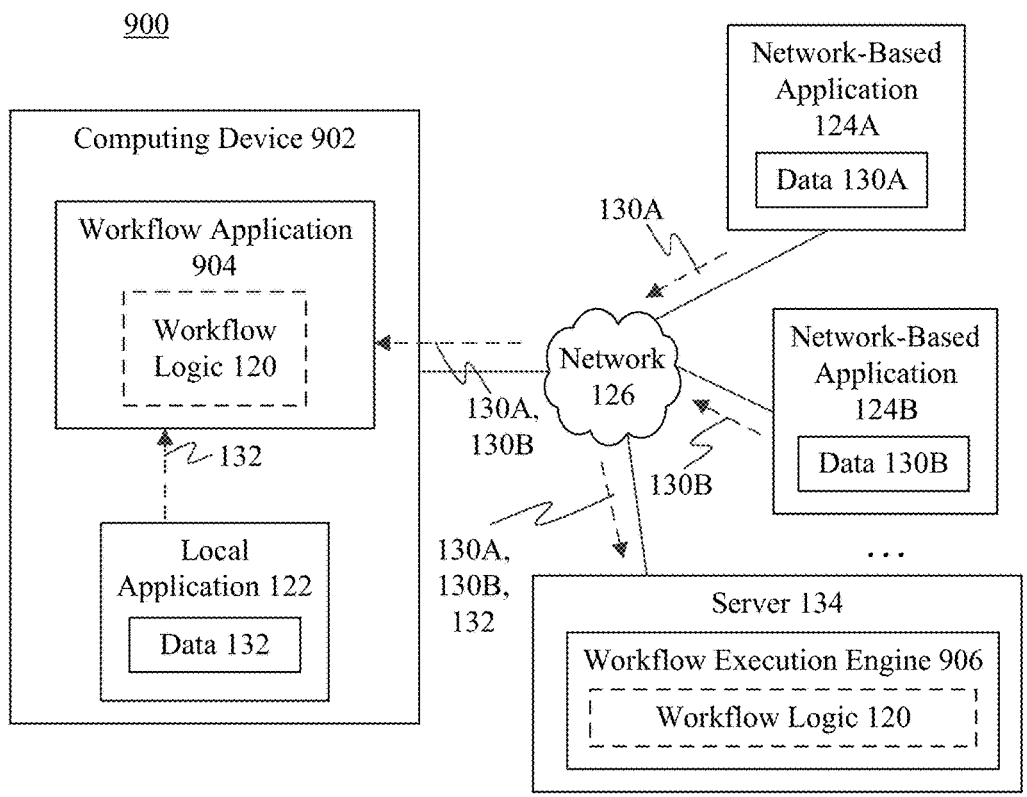
FIG. 9 shows a block diagram of a system for operating a workflow, according to an example embodiment.

FIG. 9 shows a block diagram of a system 900 for operating a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 100 is described as follows.

First and second network-based applications 124A and 124B are each optionally present, depending on the configuration of workflow logic 120. Further network-based applications may be present, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 120 for a selected workflow (e.g., selected from a workflow library by a user), and may execute workflow logic 102 to execute the workflow.

In another embodiment, workflow application 902 may be configured to execute workflows at computing device 902. For instance, an end user of computing device 902 may interact with a user interface of workflow application 902 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may operate in workflow application 904 at computing device 902 and a second portion of workflow logic 120 may operate in workflow execution engine 906 at server 134 and/or elsewhere.

Figure 10:
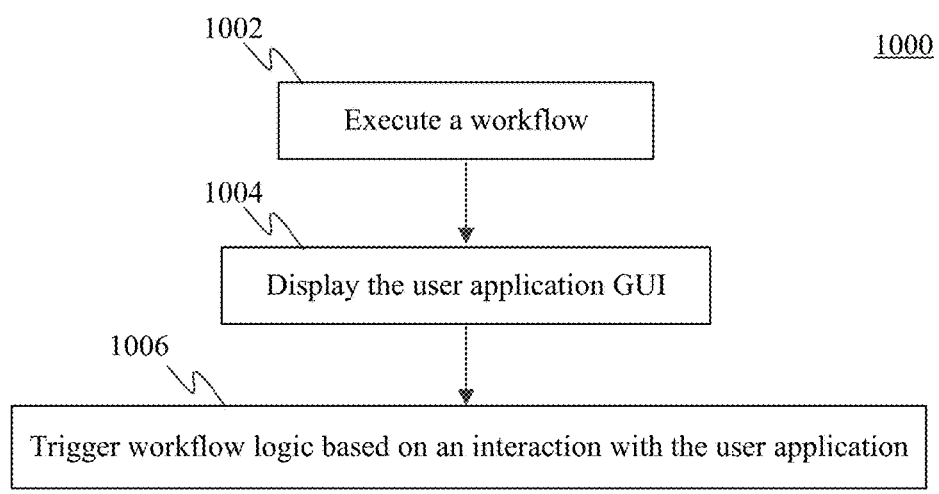
FIG. 10 shows a flowchart providing a process for executing a user application that includes one or more workflows, according to an example embodiment.

FIG. 10 shows a flowchart 1000 providing a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other applications, local or network-based.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

C. Example Embodiments for Visualization of a Created Flow for Debugging

Embodiments enable a developer to develop a workflow, as described above, and to test the workflow for debug purposes. For instance, as a result of the debug, the developer may change input parameter values for the workflow to fix resulting errors. Embodiments enable the developer to test the workflow in place in workflow designer 106, displaying input parameter values and output parameter values for each workflow step during the test run. The developer may be enabled to toggle each workflow step, separately, or the entire workflow between a development mode, where the developer may edit input parameter values, and a test mode, where the developer is displayed (but cannot edit) the input parameter values and is displayed the output parameter values at each workflow step.

Still further, a record of workflow runs of a workflow is maintained, each workflow run recording storing input parameter values and output parameter values for each workflow step during the workflow run, as well as any error and/or warning messages occurring during the workflow run due to problems with the workflow. The developer can select any workflow run record (e.g., from a list of workflow runs) to view the results of the corresponding workflow run.

Figure 11:
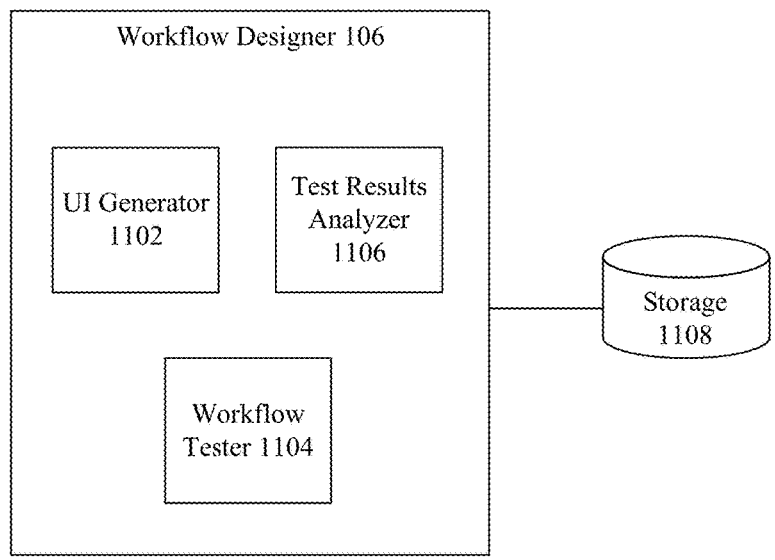
FIG. 11 shows a block diagram of a workflow designer configured to activate a test mode for a workflow being designed by a developer, according to an example embodiment.

For example, FIG. 11 shows a block diagram of workflow designer 106 configured to activate a test mode for a workflow being designed by a developer, according to an example embodiment. Workflow designer 106 in FIG. 11 is an example of workflow designer 106 shown in FIGS. 1 and 3. As shown in FIG. 11, workflow designer 106 includes a user interface generator 1102, a workflow tester 1104 and a test results analyzer 1106. Workflow designer 106 is coupled to storage 1108.

UI generator 1102 is an example of UI generator 110, as shown in FIG. 1. Accordingly, UI generator 1102 may be configured to render a visual representation of a workflow by displaying each workflow step of the workflow in sequence in a graphical user interface (GUI). UI generator 1102 provides at least one control (e.g., an interactive element, such as a button) configured to enable test of the workflow in the GUI. The at least one control is configured to enable a user to transition one or more workflow steps of the workflow (or the workflow in its entirety) from a development mode to a test mode.

Workflow tester 1104 enables testing of workflows. For example, workflow tester 1104 may be configured to execute one or more workflow steps of a particular workflow and provide an indication to the developer as to whether the workflow step(s) were completed successfully or failed. For instance, workflow tester 1104 may display which workflow step(s) were completed successfully, and the input parameter values and the output parameter values for each of the workflow step(s). In accordance with an embodiment, when in test mode, workflow tester 1104 enables the developer to select the input parameter values for each of the workflow step(s). In accordance with another embodiment, when in test mode, workflow tester 1104 is configured to automatically determine the input parameter value(s) for one or more of the workflow step(s). For example, suppose a developer creates a workflow that comprises a first workflow step and a second workflow step. The first step is configured to generate a trigger in response to determining that an email has been received. The second step is configured to perform a particular action responsive to the trigger. In this example, the input parameter for the first step is an email. When testing the workflow, instead of waiting for a user to receive a new email to determine whether the particular action is performed, workflow tester 1104 may access an email program's inbox (e.g., an inbox associated with the developer) and use a particular email (e.g., the most recent email) from that inbox as the input parameter. In accordance with such an embodiment, the first workflow step may comprise first program code that is configured to be executed during normal execution of the workflow and second program code that is configured to be executed during testing of the workflow. The first program code is configured to generate the trigger in response to receiving an email, and the second program code is configured to generate the trigger in response to retrieving an email from an inbox.

Workflow tester 1104 may be further configured to display in the visual representation, for each of the one or more workflow steps transitioned to the test mode, parameter values for each input and output parameter generated during the test workflow run.

As described above, after the workflow has been executed in test mode, an indication is provided to the developer of whether the workflow step(s) were completed successfully or failed. For example, the developer may receive an email that includes the results of the workflow test.

The results of each test may be stored in storage 1108. For example, upon completion of each test run, workflow tester 1104 may create a record for the test workflow run and store the record in storage 1108. The record may include a list of input parameters and/or output parameters (and their respective values) for each workflow step of the workflow for each test run. The record may also include any error and/or warning messages that occurred during the workflow test due to problems with the workflow for each run. The record may further include a status for each run of the workflow test (e.g., whether the test succeeded or failed), a time and/or date at which each run of the workflow test, a duration of the workflow execution, and/or a duration of each step of the workflow for each run of the workflow test. Storage 1108 may be a hard disk, a removable magnetic disk, a removable optical disk, flash memory cards, secure digital (SD) memory cards, digital video disks, random access memories (RAMs), and the like.

Test results analyzer 1106 enables a developer to select and view workflow run records. For example, test results analyzer 1106 may be configured to display (e.g., via a GUI) a history of runs of a workflow, enable a user to select a workflow run from the history, and render a visual representation of the workflow run by displaying the workflow including each workflow step of the workflow in sequence, and displaying for each workflow step in the visual representation parameter values for each input and output parameter during the workflow run.

Figure 12:
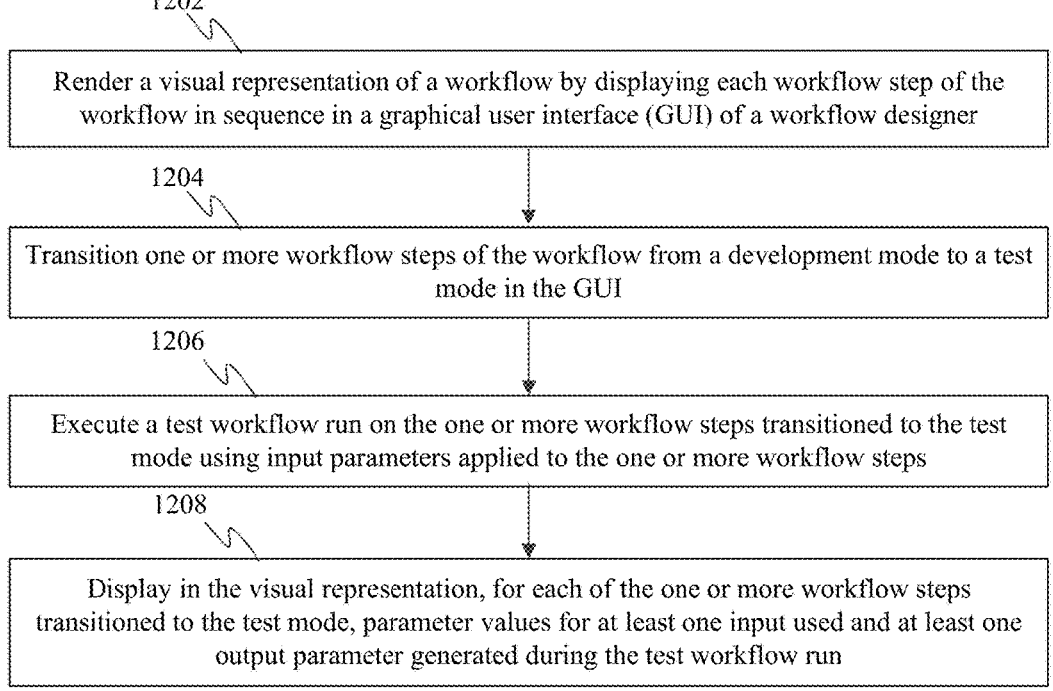
FIG. 12 shows a flowchart providing a process for visualizing results of a workflow run, according to an example embodiment.

Accordingly, in embodiments, workflow designer 106 may be configured to visualize results of a workflow run in many ways. For instance, FIG. 12 shows a flowchart 1200 of a method for visualizing results of a workflow run, according to an example embodiment. The method of flowchart 1200 may be implemented by workflow designer 106 as described above in reference to FIG. 11. Note that not all steps of flowchart 1200 need be performed in all embodiments.

Flowchart 1200 begins with step 1202. In step 1202, a visual representation of a workflow is rendered by displaying each workflow step of the workflow in sequence in a GUI of a workflow designer. For example, with reference to FIG. 11, UI generator 1102 renders a visual representation of the workflow by displaying each workflow step of the workflow in sequence in a GUI of a workflow designer. For instance, UI generator 1102 may be configured to transmit workflow GUI information (e.g., GUI information 134, as shown in FIG. 1 (e.g., one or more web pages, image content, etc.)) to a browser (e.g., browser 136, as shown in FIG. 1) to be displayed as a workflow designer GUI (e.g., workflow designer GUI 116, as shown in FIG. 1) in a display screen (display screen 108, as shown in FIG. 1) in a browser window (e.g., browser window 114).

Figure 13:
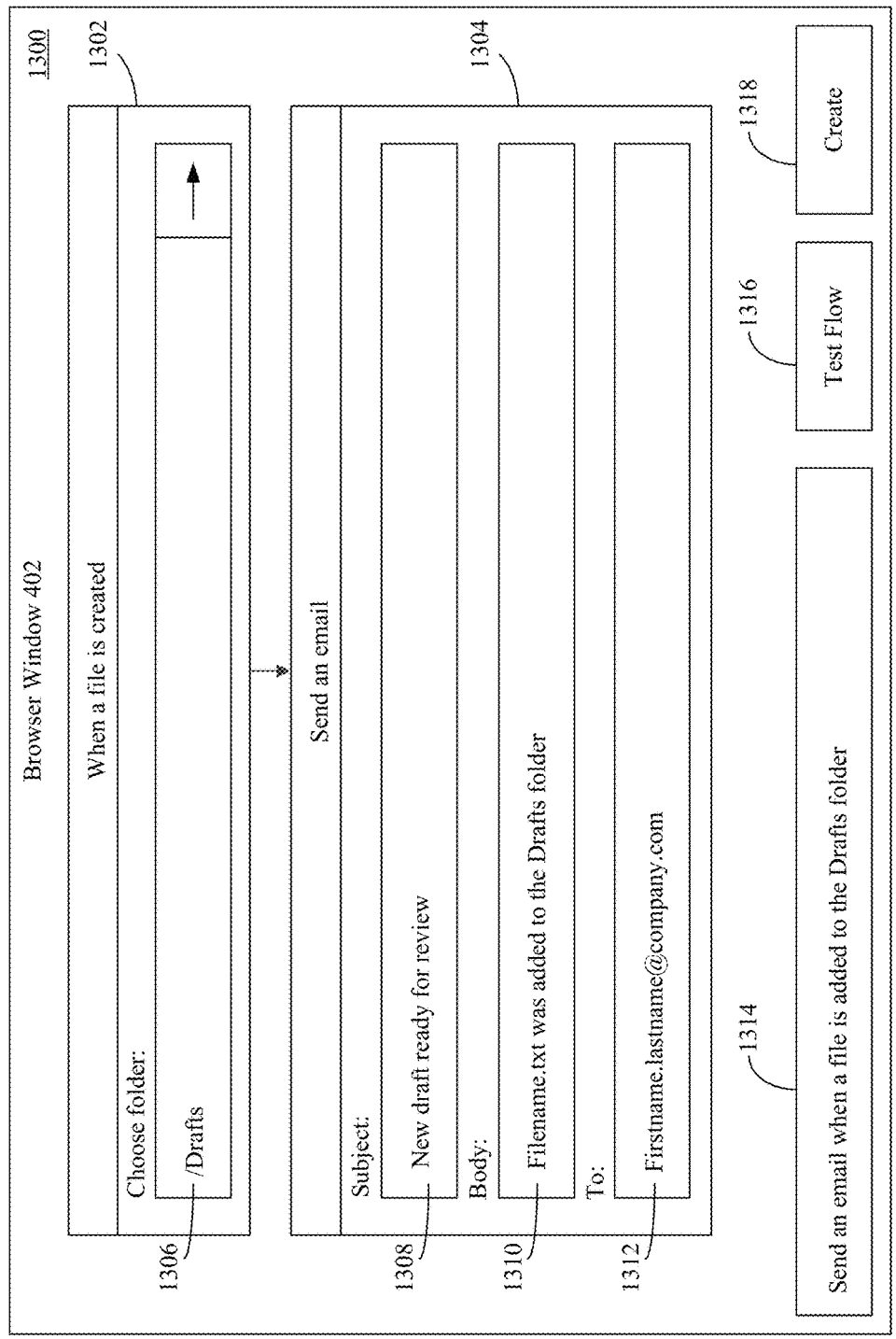
FIG. 13 shows a block diagram view of a browser window displaying a visual representation of a workflow that is rendered by displaying a plurality of workflow steps of a workflow in a GUI of workflow designer, according to an example embodiment.

Reference is made to FIG. 13 for purposes of illustration. FIG. 13 shows a block diagram view of a browser window 402 displaying a visual representation of a workflow that is rendered by displaying a plurality of workflow steps of a workflow in a GUI 1300 of workflow designer 106, according to an example embodiment. Browser window 402 is displayed in a display screen of a computing device, such as display screen 108 in FIG. 4. In the example of FIG. 13, a developer has selected and inserted several example workflow steps into a workflow. The workflow steps are rendered in browser window 402, including workflow steps 1302 and 1304. Workflow step 1302 is a "trigger" step that generates a trigger when a file is created in a particular directory (e.g., the "/Drafts" directory"). Workflow step 1302 includes one rendered input control 1306 corresponding to one input parameter. Input control 1306 enables the developer to select the directory that causes a trigger to be generated when a file is created therein. As shown in FIG. 13, the developer has entered a directory name of "/Draft" as the corresponding parameter value. Workflow step 1304 is a "action" step that sends an email to a particular recipient responsive to receiving the trigger (i.e., when the file is created in the "/Drafts" directory). Workflow step 1304 includes three rendered input controls 1308, 1310, and 1312 corresponding to three input parameters, shown as "Subject" (text box), "To:" (text box), and "From:" (text box). Input controls 1308, 1310, and 1312 respectively enable a user to enter the subject, body, and recipient email address of the email to be sent upon workflow step 1304 receiving the trigger generated by workflow step 1302. Steps 1302 and 1304, may be selected and rendered in a GUI in any manner.

As further shown in FIG. 13, browser window 402 includes three rendered input controls 1314, 1316, and 1318. Input control 1314 enables a user to enter the name of the workflow being developed (e.g., "Send an email when a file is added to the Drafts folder"). Input control 1316 enables the developer to transition workflow step(s) of the workflow to a test mode and perform a workflow test for the workflow being developed. Input control 1318 enables the developer to create (e.g., save) the workflow after it has been developed and tested such that one or more users may utilize the workflow.

In step 1204, one or more workflow steps of the workflow are transitioned from a development mode to a test mode in the GUI. For example, with reference to FIG. 11, workflow tester 1104 transitions one or more workflow steps of the workflow from a development mode to a test mode in the GUI. With reference to FIG. 13, the developer may select one or more of workflow steps (e.g., workflow steps 1302 and 1304) that the developer desires to transition to test mode and activate input control 1316 to transition the selected workflow step(s). Alternatively, if the developer desires to transition all the workflow step of the workflow, the developer may simply select activate input control 1316 without explicitly selecting workflow step(s).

In step 1206, a test workflow run is executed on the one or more workflow steps transitioned to the test mode using input parameters applied to the one or more workflow steps. For example, with reference to FIGS. 11 and 13, workflow tester 1104 executes the test workflow run on the one or more workflow steps transitioned to the test mode using input parameters applied to the one or more workflow steps in response to the developer activating input control 1316.

Figure 14:
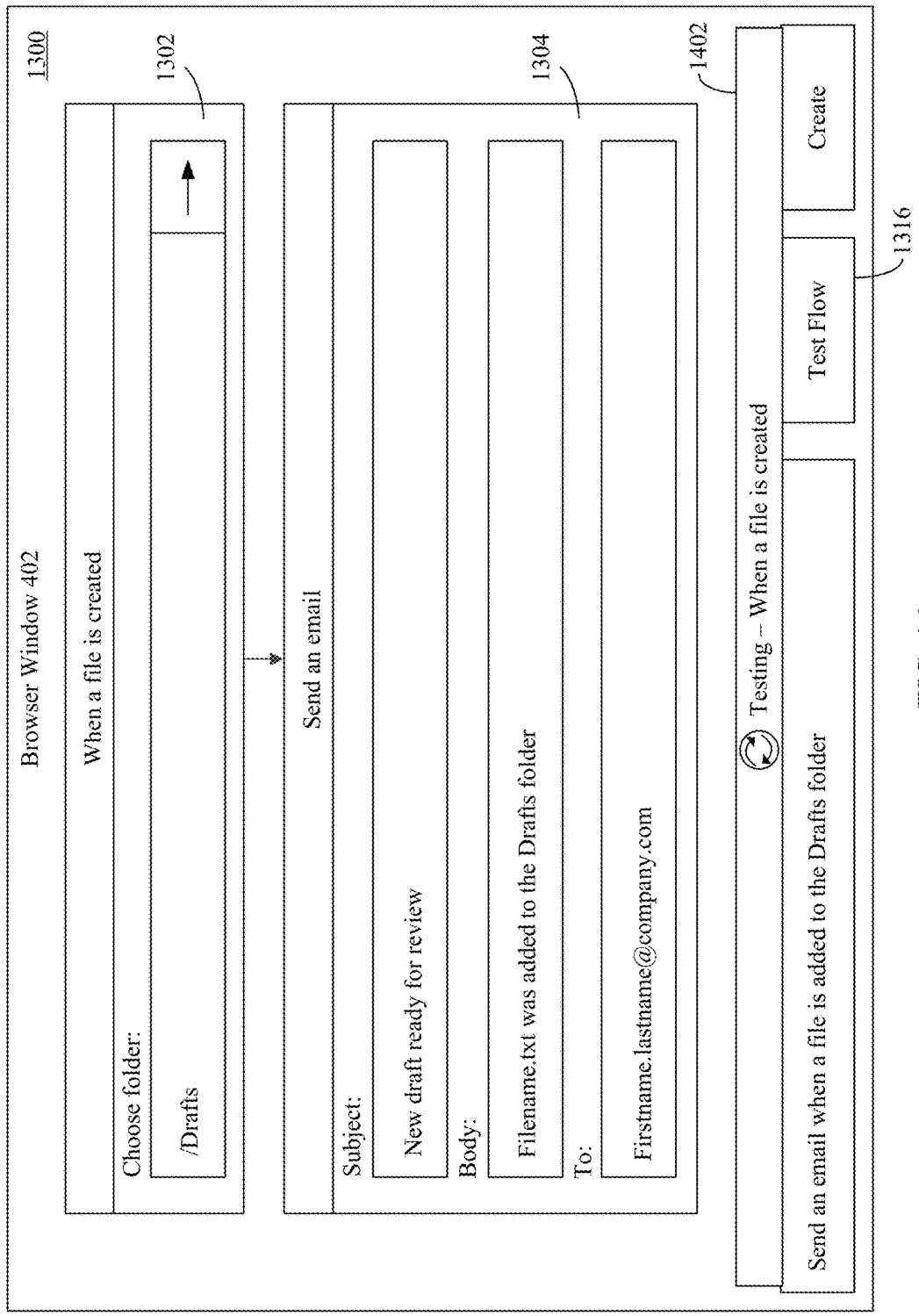
FIG. 14 shows a block diagram view of a workflow development GUI, after the developer has an activated input control, according to an example embodiment.

Continuing the example of FIG. 13, FIG. 14 shows a block diagram view of workflow development GUI 1300, after the developer has activated input control 1316, according to an example embodiment. As shown in FIG. 14, after the developer has activated input control 1316, a status message 1402 is rendered via GUI 1300. Status message 1402 may indicate that that a test is currently being executed and/or the name of workflow step being presently tested. In the example shown in FIG. 14, workflow step 1302 ("When a file is created") is being presently tested.

In accordance with one or more embodiments, a parameter value for an input parameter used during the test workflow run is automatically determined. For example, with reference to FIG. 11, workflow tester 1104 may automatically determine the parameter value. In the examples shown in FIGS. 13 and 14, workflow tester 1104 may automatically determine the parameter value for the input parameter corresponding to input control 1306. For example, instead of having the developer create a file in the "/Drafts" folder to cause the trigger to be generated, workflow tester 1104 may simply use an already-existing file in the "/Drafts" folder as the input parameter. In the event that no file exists in the "/Drafts" folder, an error message may be displayed to the user indicating that a file should be added to the "/Drafts" folder.

Figure 15:
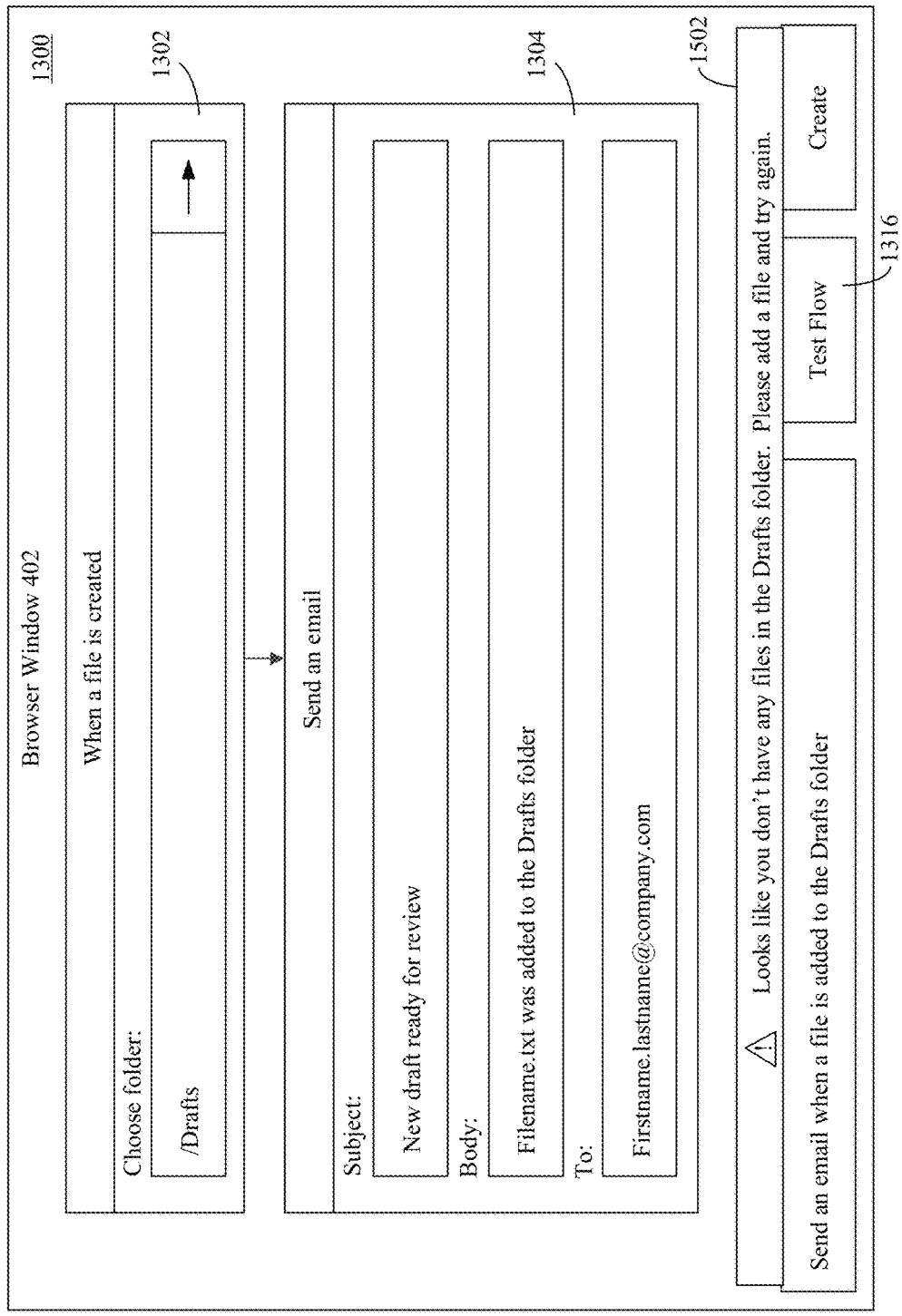
FIG. 15 shows a block diagram view of a workflow development GUI, in the event that an error occurred when testing a workflow, according to an example embodiment.

Continuing with the example of FIG. 14, FIG. 15 shows a block diagram view of workflow development GUI 1300, in the event that an error occurred when testing a workflow, according to an example embodiment. As shown in FIG. 15, if an error has occurred when testing a workflow, an error message 1502 is rendered via GUI 1300. Error message 1502 may indicate one or more reasons why the test failed. In the example shown in FIG. 15, error message 1502 indicates that the "/Drafts" folder does not have any files and that a file should be added to it. In response to viewing error message 1502, the developer may add a file to the "/Drafts" file and execute another test workflow run by activating input control 1316.

Figure 16:
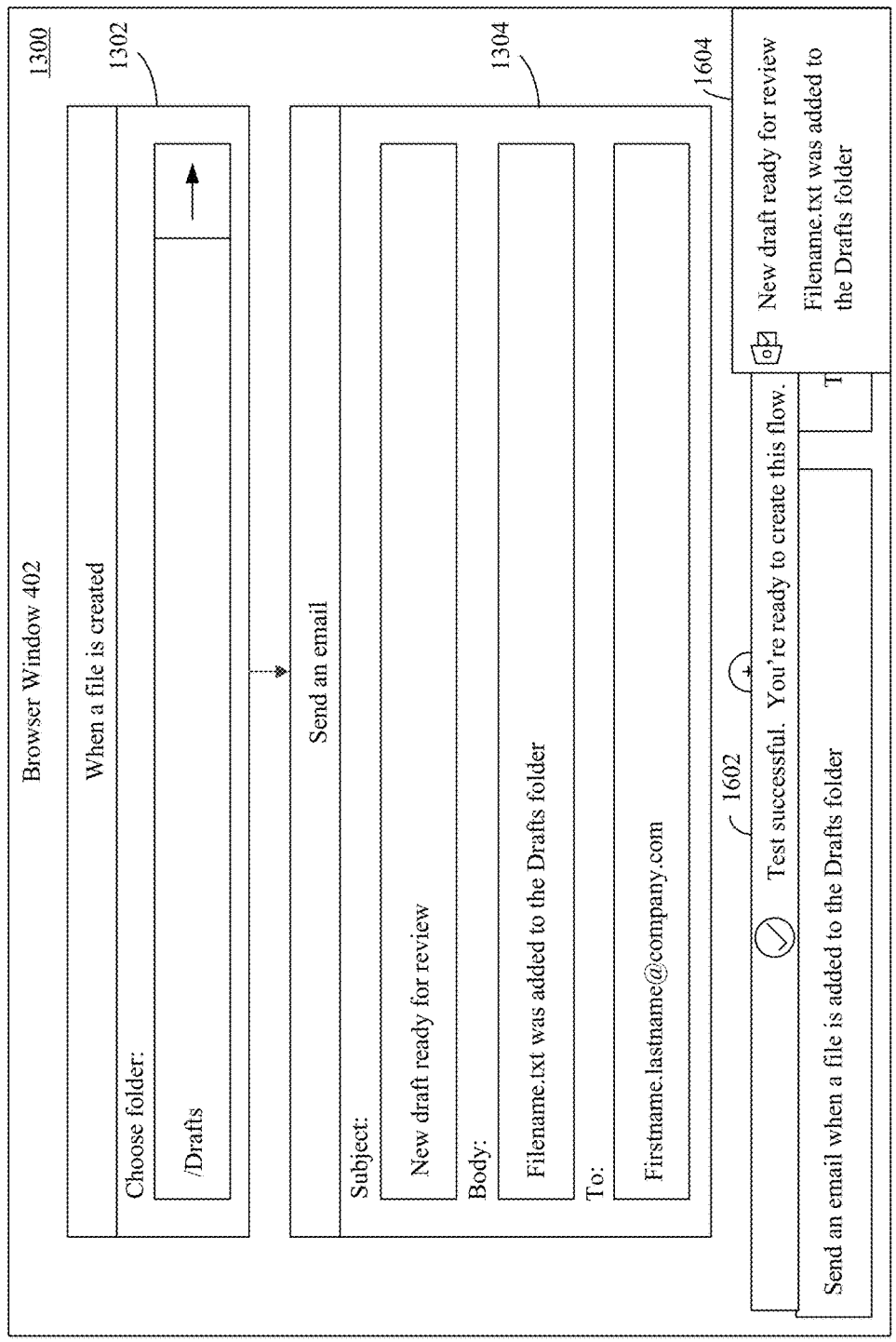
FIG. 16 shows a block diagram view of a workflow development GUI after the developer has executed another test workflow run, according to an example embodiment.

Continuing with the example of FIG. 15, FIG. 16 shows a block diagram view of workflow development GUI 1300 after the developer has executed another test workflow run, according to an example embodiment. As shown in FIG. 16, a status message 1602 is rendered via GUI 1300 indicating that the test workflow run was successful and that the developer is ready to create the flow (e.g., by activating input element 1318, as shown in FIG. 13). As further shown in FIG. 16, a notification 1604 from an email client associated with the developer is displayed indicating that the email generated as a result of workflow step 1304 was received.

In step 1208, for each of the one or more workflow steps transitioned to the test mode, parameter values for at least one input used and at least one output parameter generated during the test workflow run are displayed in the visual representation. For example, with reference to FIG. 11, UI generator 1102 displays in the visual representation, parameter values for at least one input used and at least one output parameter generated during the test workflow run for each of the one or more workflow steps transitioned to the test mode.

Figure 17:
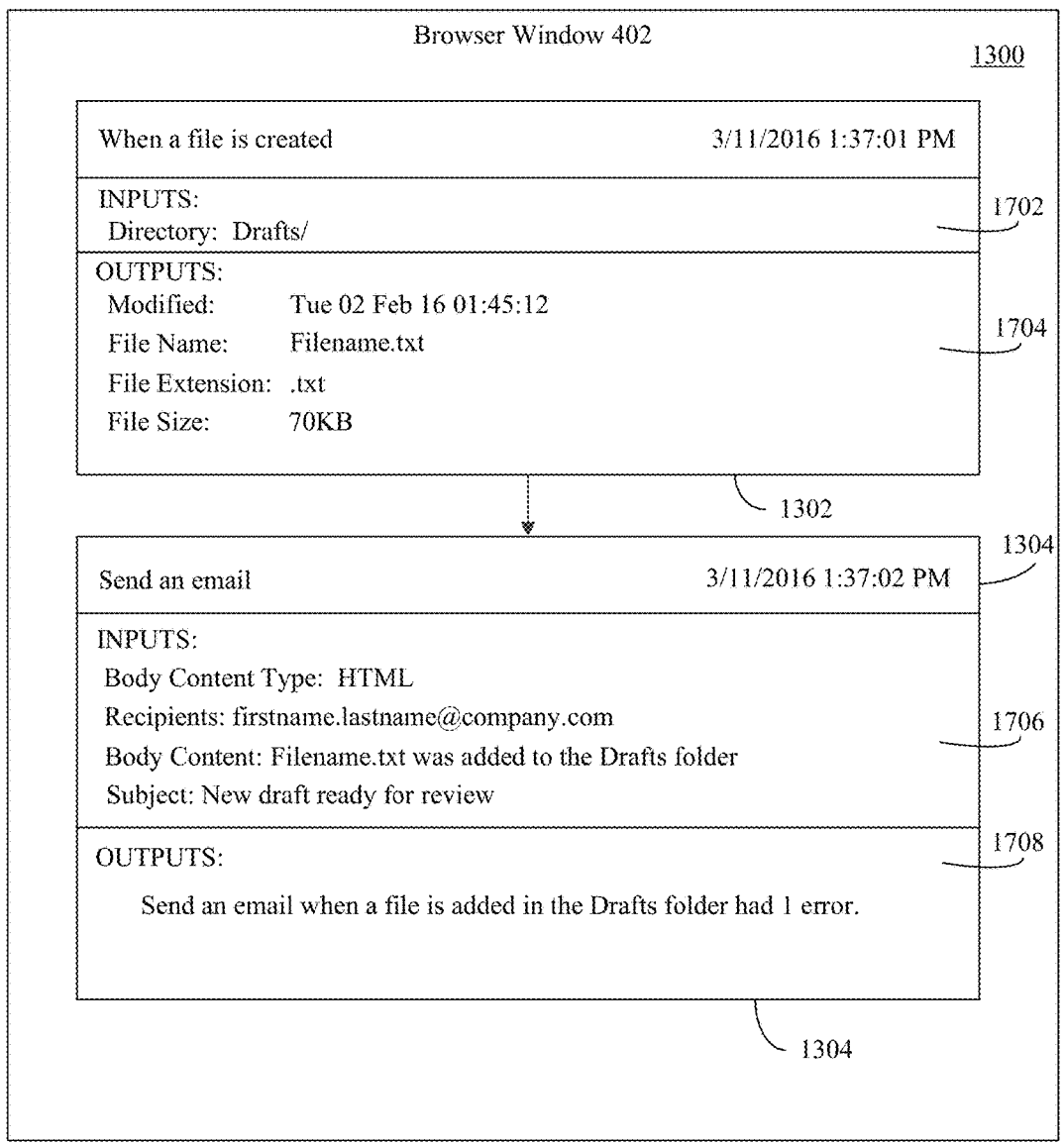
FIG. 17 shows a block diagram view of a workflow development GUI that displays in the visual representation parameter values for at least one input used and at least one output parameter generated during the test workflow run for each of the one or more workflow steps transitioned to the test mode, according to an example embodiment.

Continuing with the example of FIG. 16, FIG. 17 shows a block diagram view of workflow development GUI 1300 that displays in the visual representation, parameter values for at least one input used and at least one output parameter generated during the test workflow run for each of the one or more workflow steps transitioned to the test mode, according to an example embodiment. As shown in FIG. 17, workflow step 1302 may have an associated input parameter section 1702 and an output parameter section 1704 and workflow step 1304 may have an associated input parameter section 1706 and an output parameter section 1708. Input parameter section 1702 displays the input parameters (and their values) used for workflow step 1302 (e.g., the name of the directory), and output parameter section 1704 displays the output parameters (and their values) used for workflow step 1302 (e.g., date the workflow was modified, the file name of the file added to the directory, the file extension of the file and/or the file size). Input parameter section 1706 displays the input parameters (and their values) used for workflow step 1304 (e.g., the content type of the body of the email, the recipient(s) of the email, the content of the body of the email and/or the subject of the email), and output parameter section 1708 displays the output parameters (and their values) used for workflow step 1304 (e.g., an error message that is presented to the developer in the event that the workflow fail).

As described above, the developer may be enabled to select and view test workflow run records. For example, workflow designer 106 may be configured to display (e.g., via GUI) a history of runs of a workflow tests, enable a user to select a workflow run from the history, and render a visual representation of the workflow run by displaying the workflow including each workflow step of the workflow in sequence, and displaying for each workflow step in the visual representation parameter values for each input and output parameter during the workflow run.

Figure 18:
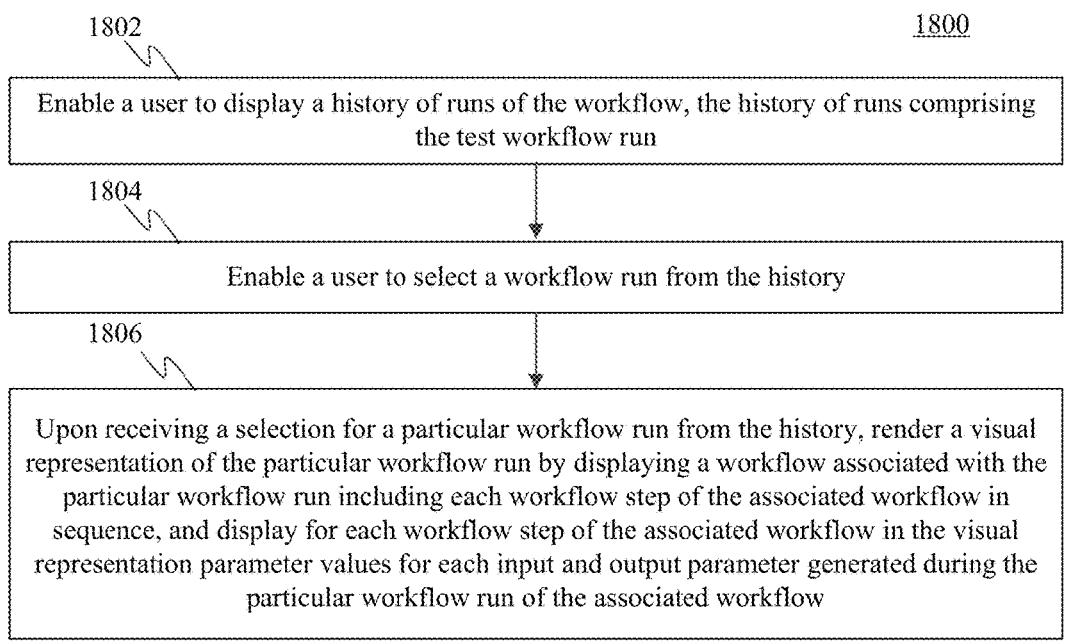
FIG. 18 shows a flowchart providing a process for displaying a history of runs of workflow tests, according to an example embodiment.

Accordingly, in embodiments, workflow designer 106 may be configured to display a history of runs of workflow tests in many ways. For instance, FIG. 18 shows a flowchart 1800 of a method for displaying a history of runs of workflow tests, according to an example embodiment. The method of flowchart 1800 may be implemented by workflow designer 106 as described above in reference to FIG. 11. Note that not all steps of flowchart 1800 need be performed in all embodiments.

Flowchart 1800 begins with step 1802. In step 1802, a user is enabled to display a history of runs of the workflow, the history of runs comprising the test workflow run. For instance, with reference to FIG. 11, test results analyzer 1106 may render an input control that enables a user to display a history of runs of the workflow. In accordance with an embodiment, the input control may be included in an email message sent to the developer in response to a test workflow run failing.

Figure 19:
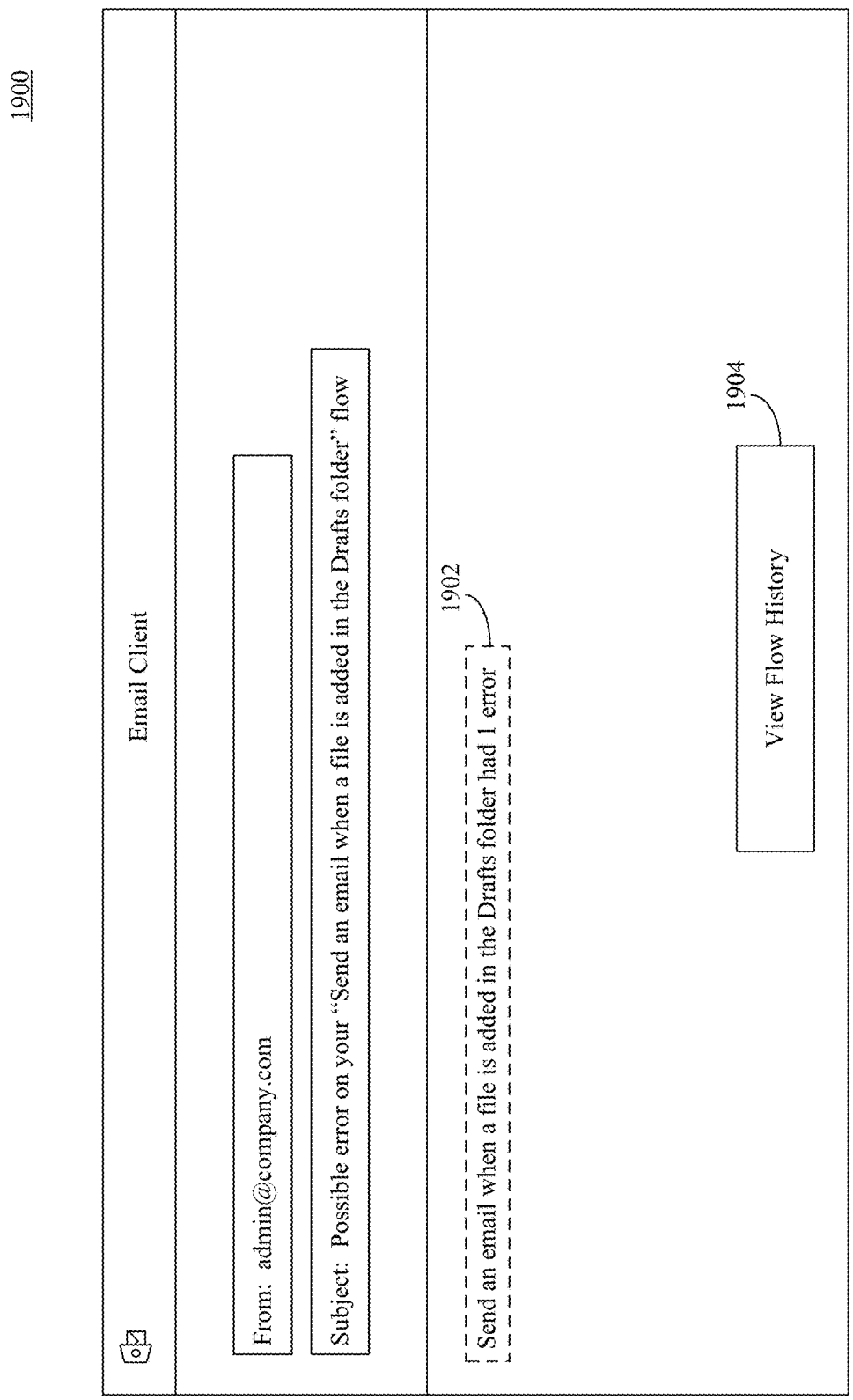
FIG. 19 shows a block diagram view of an email message sent to the developer in response to a test workflow run failing, according to an example embodiment.

Continuing with the example of FIG. 15, FIG. 19 shows a block diagram view of an email message 1900 sent to the developer in response to a test workflow run failing, according to an example embodiment. As shown in FIG. 19, the body of email message 1900 includes an error message 1902 ("Send an email when a file is added in the Drafts folder had 1 error") and an input control 1904. Input control 1902, when activated, enables the developer to view a history of test workflow runs.

In step 1804, a user is enabled to select a workflow run from the history. For instance, with reference to FIG. 11, test results analyzer 1106 enables the user to select a workflow run for the history. For example, a list of user-selectable test workflow runs may be displayed to the user.

Continuing with the example of FIG. 19, FIG. 20 shows a block diagram view of a GUI screen 2000 displayed to the developer in response to the developer activating input control 1902 (as shown in FIG. 19), according to an example embodiment. As shown in FIG. 20, GUI screen 2000 includes a name 2002 of the workflow (e.g., "Send an email when a file is added to the Drafts folder"), and a listing of test workflow runs 2004A-2004G for that workflow. For each of the test workflow runs, a status, a start day and/or time, and an execution duration of that test workflow run may be displayed. The status indicates whether or not that test workflow run completed successfully, the start time indicates the date and/or time at which the test workflow run was executed, and the execution duration indicates the duration of the test workflow run execution. Each of test workflow runs 2004A-2004G may be user-selectable.

In step 1806, upon receiving a selection for a particular workflow run from the history, a visual representation of the particular workflow run is rendered by displaying a workflow associated with the particular workflow run including each workflow step of the associated workflow in sequence, and, for each workflow step of the associated workflow in the visual representation, parameter values for each input and output parameter generated during the particular workflow run of the associated workflow are displayed. For instance, with reference to FIG. 11, workflow designer 106 renders the visual representation of the particular workflow run and displays, for each workflow step of the associated workflow in the visual representation, parameter values for each input and output parameter generated during the particular workflow run of the associated workflow.

For example, with continued reference to FIG. 20, upon selection of one of test workflow runs 2004A-2004G, the selected test workflow run (including the workflow steps and their respective input parameters and output parameters) is displayed to the developer in a similar manner as shown in FIG. 17.

In accordance with one or more embodiments, the parameter values for each input and output parameter for each workflow step of the associated workflow are retrieved from a repository of parameter values (e.g., storage 1104, as shown in FIG. 11). The retrieved parameter values are then displayed for each workflow step of the associated workflow in the visual representation as shown in FIG. 17.

D. Example Embodiments for Growing a Workflow to an Application

According to embodiments, a workflow, as developed herein using a workflow designer used to select workflow steps, enter parameter values, and otherwise develop the workflow in a visual manner (not viewing workflow code), may be transitioned to being developed in a development tool that enables direct editing of the workflow's program code. This, for example, enables a workflow to transition from being a business application (developed by a business developer) to a robust workflow or software application that may be further developed by IT personnel using a more advanced set of tools. This is enabled because the workflow logic generated herein may be transported between a visual workflow designer and a full-blown code editor (e.g., a source code editor), with the visual workflow designer able to operate on the workflow visually, and the code editor able to operate on the program code of the workflow.

Figure 21:
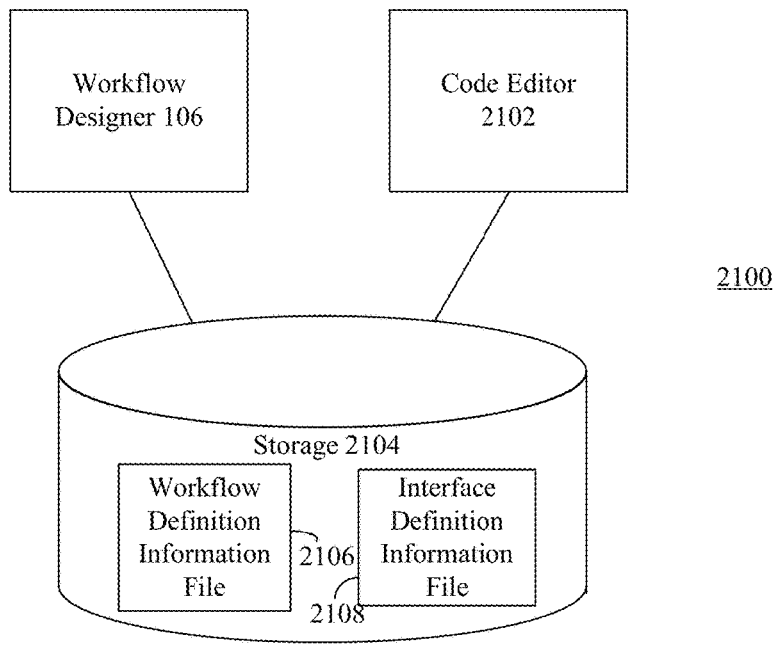
FIG. 21 shows a block diagram of a system configured for growing a workflow to an application, according to an example embodiment.

For example, FIG. 21 shows a block diagram of system 2100 configured for growing a workflow to an application, according to an example embodiment. System 2100 includes a workflow designer 106, a code editor 2102, and storage 2104. Workflow designer 106 in FIG. 21 is an example of workflow designer 106 shown in FIGS. 1, 3 and 11. Workflow designer 106, code editor 2102, and/or storage 2104 may be included in a server (e.g., server 134, as shown in FIG. 1). System 2100 of FIG. 21 is described as follows.

Figure 22:
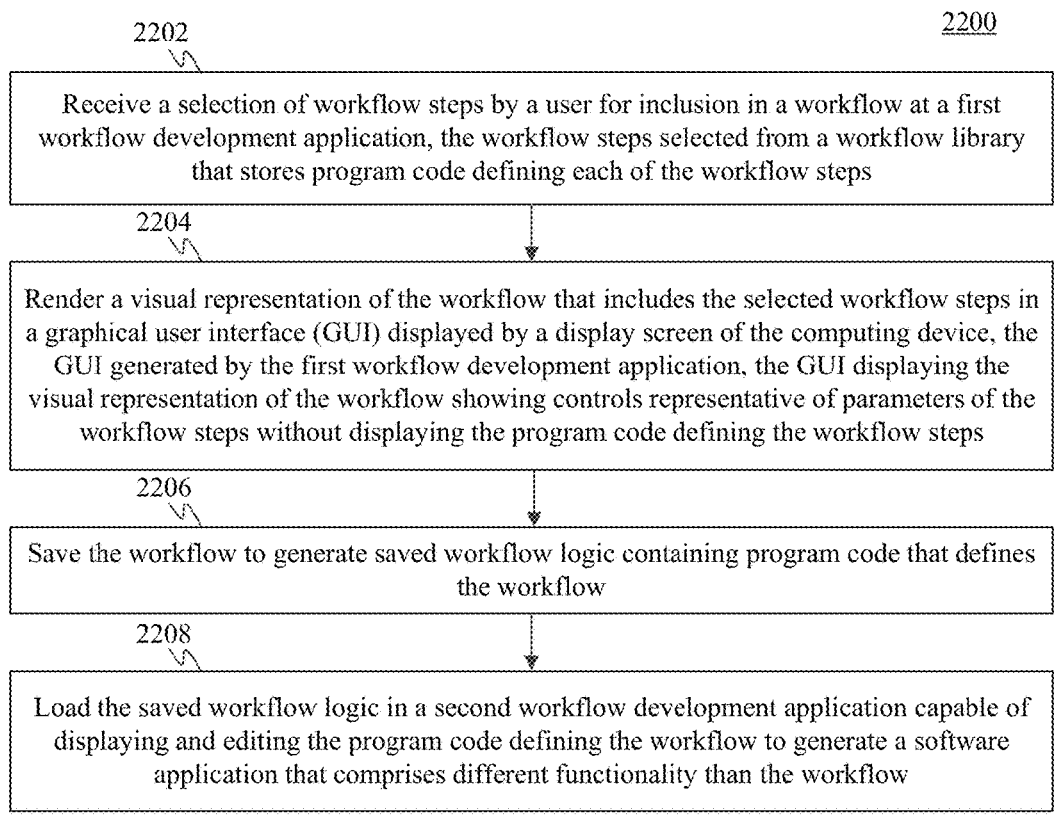
FIG. 22 shows a flowchart providing a process for growing a workflow to an application, according to an example embodiment.

In particular, system 2100 is described with respect to FIG. 22. FIG. 22 shows a flowchart 2200 providing a process for growing a workflow to an application, according to an example embodiment. In an embodiment, workflow designer 106 and/or code editor 2102 may operate according to flowchart 2200. Note that not all steps of flowchart 2200 need be performed in all embodiments.

Flowchart 2200 begins with step 2202. In step 2202, a selection of workflow steps by a user for inclusion in a workflow is received at a first workflow development application. The workflow steps may be selected from a workflow library (e.g., workflow library 118, as shown in FIG. 1) that stores program code defining each of the workflow steps. For example, with reference to FIG. 21, a first workflow application (e.g., workflow designer 106) may receive a selection of workflow steps by a user for inclusion in a workflow. Example techniques for enabling a developer to select a workflow step for inclusion in a workflow are described above, including with respect to step 204 of flowchart 200 (FIG. 2). For instance, step selector 308 of FIG. 3 may be interacted with by a developer to select a workflow step, and to insert the selected workflow step into a workflow, as described above (e.g., with respect to FIG. 7). Alternatively, a developer may select a workflow step from a gallery (e.g., as described above with respect to workflow step gallery generator 302 of FIG. 3), may select a template that includes workflow steps (e.g., as described above with respect to template gallery generator 304 of FIG. 3), or may select and insert a workflow step into a workflow in another manner.

In step 2204, a visual representation of the workflow is rendered that includes the selected workflow steps in a graphical user interface (GUI) displayed by a display screen of the computing device. The GUI is generated by the first workflow development application. The GUI displays the visual representation of the workflow shows controls representative of parameters of the workflow steps without displaying the program code defining the workflow steps. For example, with reference to FIG. 22, workflow designer 106 renders the visual representation of the workflow. Example techniques for rendering a visual representation of the workflow are described above, including with respect to UI generator 110 of FIG. 1. For instance, UI generator 110 may be configured to transmit workflow GUI information 134 (e.g., one or more web pages, image content, etc.) to browser 136 to be displayed as workflow designer GUI 116 in a display screen 108 in browser window 114.

In step 2206, the workflow is saved to generate a saved workflow logic containing program code that defines the workflow. For example, with reference to FIG. 21, workflow designer 106 saves the workflow in storage 2104 to generate saved workflow logic containing program code that defines the workflow.

In accordance with one or more embodiments, each workflow step in the workflow is saved in the form of a workflow definition information file and an interface definition information file. Examples of workflow definition information files and interface definition information files are described elsewhere herein (e.g., information 316 and 318, which may be stored in files, as described with respect to FIG. 3). The interface definition information file defines input and output parameters of the workflow step, and the workflow definition information file defines parameter values for input and output parameters of the workflow step. For example, with reference to FIG. 21, each workflow step in the workflow is saved in the form a workflow definition information file 2106 and an interface definition information file 2108.

In step 2208, the saved workflow logic is loaded in a second workflow development application capable of displaying and editing the program code defining the workflow to generate a software application that comprises different functionality than the workflow. For example, with reference to FIG. 21, a second workflow development application (e.g., code editor 2102) loads the saved workflow logic to generate a software application that comprises different functionality than the workflow.

For example, code editor 2102 may load workflow definition information file 2106 and interface definition information file 2108 associated with the workflow. Code editor 2102, using workflow definition information file 2106 and interface definition information file 2108, may display program code (e.g., source code) corresponding to the workflow steps of the workflow. Code editor 2012 may further enable the developer to edit workflow definition information file 2106 and interface definition information file 2108 at a code level. A developer (e.g., IT personnel) may interact with code editor 2102 to enter and modify the displayed program code to generate a software application. For instance, the developer may add, modify, or delete program code text using code editor 2102 such as by typing, by voice input, by selecting suggested code blocks, etc. Code editor 2102 may be a browser based editor, a code editor integrated in a desktop or mobile application, or any other type of code editor. The software application developed using code editor 2012 may include different and/or additional functionality than that of the workflow.

In accordance with one or more embodiments, the second workflow development application is further configured to associate the software application with one or more first users that are different that a second user associated with the workflow. For example, code editor 2102 may associate the software application with a set of one or more users, one or more user accounts, one or more email addresses, one or more email accounts, one or more organizations, etc., that are different than the user(s), user account(s), email addresses(s), email account(s), organizations, etc., that are associated with the workflow. By doing so, code editor 2102 configures the software application to be interacted with by a set of user(s) (e.g., programmers who program at the code level) that is different than the user(s) that are enabled to interact with the workflow (e.g., visual developers, who are developers that do not manipulate the application at the code level, but rather visually develop the application using a workflow designer as described further above).

III. Example Mobile and Stationary Device Embodiments

Computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, UI generator 1102, workflow tester 1104, test results analyzer 1106, storage 1108, flowchart 1200, code editor 2012, storage 2104, flowchart 200, flowchart 1000, flowchart 1200, flowchart 1800 and/or flowchart 2200 may be implemented in hardware, or hardware combined with software and/or firmware. For example, computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, UI generator 1102, workflow tester 1104, test results analyzer 1106, storage 1108, flowchart 1200, code editor 2012, storage 2104, flowchart 200, flowchart 1000, flowchart 1200, flowchart 1800 and/or flowchart 2200 may be implemented as computer program code/instructions configured to be executed in one or more processors and stored in a computer readable storage medium. Alternatively, computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, UI generator 1102, workflow tester 1104, test results analyzer 1106, storage 1108, flowchart 1200, code editor 2012, storage 2104, flowchart 200, flowchart 1000, flowchart 1200, flowchart 1800 and/or flowchart 2200 may be implemented as hardware logic/electrical circuitry.

For instance, in an embodiment, one or more, in any combination, of computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, UI generator 1102, workflow tester 1104, test results analyzer 1106, storage 1108, flowchart 1200, code editor 2012, storage 2104, flowchart 200, flowchart 1000, flowchart 1200, flowchart 1800 and/or flowchart 2200 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 23:
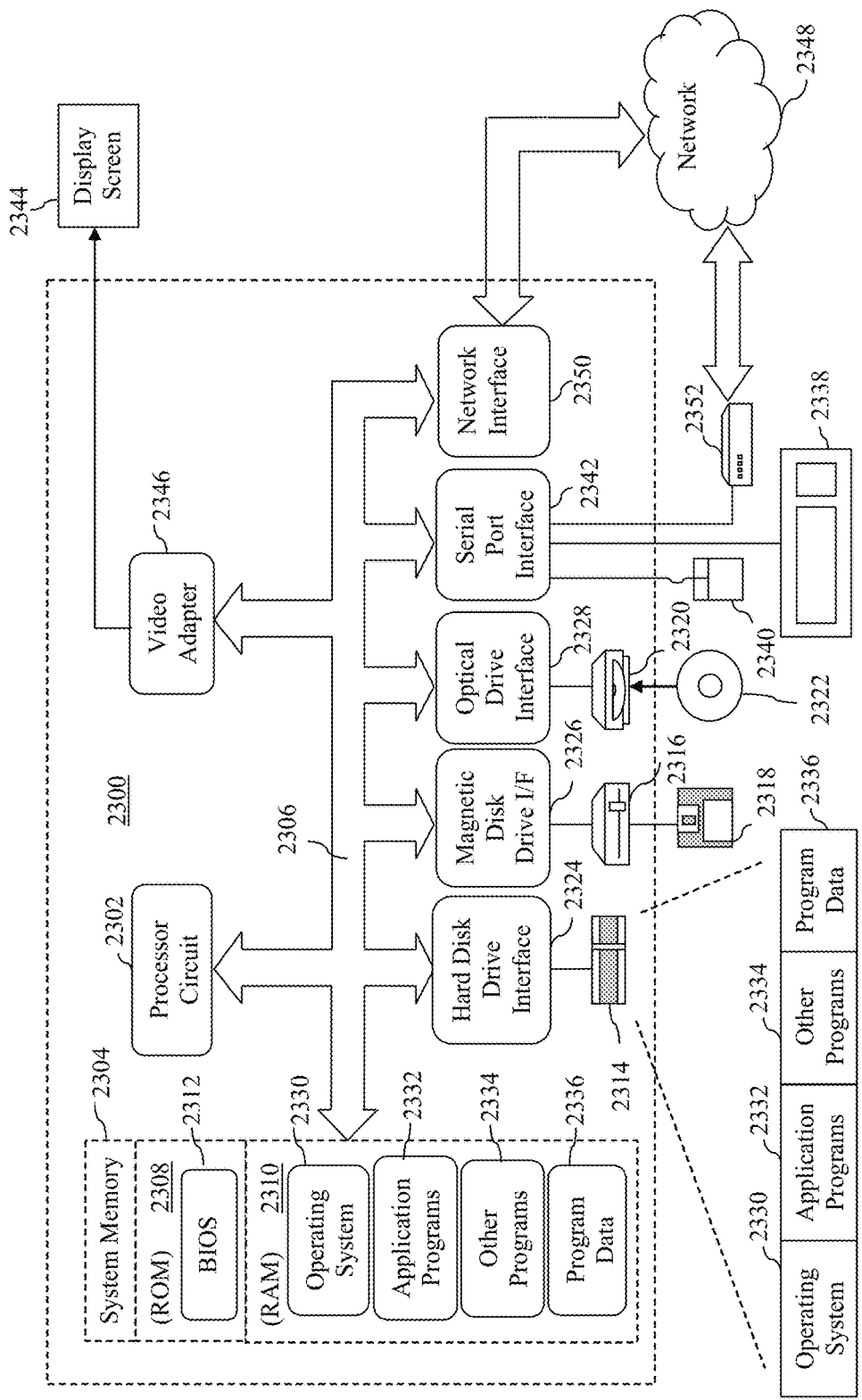
FIG. 23 shows a block diagram of an example computing device that may be used to implement embodiments.

FIG. 23 depicts an exemplary implementation of a computing device 2300 in which embodiments may be implemented. For example, any of computing device 102, server 134, and/or computing device 902 may be implemented in one or more computing devices similar to computing device 2300 in stationary or mobile computer embodiments, including one or more features of computing device 2300 and/or alternative features. The description of computing device 2300 provided herein is provided for purposes of illustration, and is not intended to be limiting. Embodiments may be implemented in further types of computer systems, as would be known to persons skilled in the relevant art(s).

As shown in FIG. 23, computing device 2300 includes one or more processors, referred to as processor circuit 2302, a system memory 2304, and a bus 2306 that couples various system components including system memory 2304 to processor circuit 2302. Processor circuit 2302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2302 may execute program code stored in a computer readable medium, such as program code of operating system 2330, application programs 2332, other programs 2334, etc. Bus 2306 represents one or more of any of several types of bus structures, including a memory bus or memory controller, a peripheral bus, an accelerated graphics port, and a processor or local bus using any of a variety of bus architectures. System memory 2304 includes read only memory (ROM) 2308 and random access memory (RAM) 2310. A basic input/output system 2312 (BIOS) is stored in ROM 2308.

Computing device 2300 also has one or more of the following drives: a hard disk drive 2314 for reading from and writing to a hard disk, a magnetic disk drive 2316 for reading from or writing to a removable magnetic disk 2318, and an optical disk drive 2320 for reading from or writing to a removable optical disk 2322 such as a CD ROM, DVD ROM, or other optical media. Hard disk drive 2314, magnetic disk drive 2316, and optical disk drive 2320 are connected to bus 2306 by a hard disk drive interface 2324, a magnetic disk drive interface 2326, and an optical drive interface 2328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2330, one or more application programs 2332, other programs 2334, and program data 2336. Application programs 2332 or other programs 2334 may include, for example, computer program logic (e.g., computer program code or instructions) for implementing computing device 102, workflow designer 106, UI generator 110, workflow logic generator 112, local application 122, network-based application 124A, network-based application 124B, server 134, workflow step gallery generator 302, template gallery generator 304, saved workflow selector 306, step selector 308, step configuration UI generator 310, workflow definition generator 312, interface definition generator 314, computing device 902, workflow application 904, workflow execution engine 906, UI generator 1102, workflow tester 1104, test results analyzer 1106, storage 1108, flowchart 1200, code editor 2012, storage 2104, flowchart 200, flowchart 1000, flowchart 1200, flowchart 1800 and/or flowchart 2200 (including any suitable step of flowcharts 200, 1000, 1200, 1800, and/or 2200), and/or further embodiments described herein.

A user may enter commands and information into the computing device 2300 through input devices such as keyboard 2338 and pointing device 2340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2302 through a serial port interface 2342 that is coupled to bus 2306, but may be connected by other interfaces, such as a parallel port, game port, or a universal serial bus (USB).

A display screen 2344 is also connected to bus 2306 via an interface, such as a video adapter 2346. Display screen 2344 may be external to, or incorporated in computing device 2300. Display screen 2344 may display information, as well as being a user interface for receiving user commands and/or other information (e.g., by touch, finger gestures, virtual keyboard, etc.). In addition to display screen 2344, computing device 2300 may include other peripheral output devices (not shown) such as speakers and printers.

Computing device 2300 is connected to a network 2348 (e.g., the Internet) through an adaptor or network interface 2350, a modem 2352, or other means for establishing communications over the network. Modem 2352, which may be internal or external, may be connected to bus 2306 via serial port interface 2342, as shown in FIG. 23, or may be connected to bus 2306 using another interface type, including a parallel interface.

As used herein, the terms "computer program medium," "computer-readable medium," and "computer-readable storage medium" are used to refer to physical hardware media such as the hard disk associated with hard disk drive 2314, removable magnetic disk 2318, removable optical disk 2322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 2332 and other programs 2334) may be stored on the hard disk, magnetic disk, optical disk, ROM, RAM, or other hardware storage medium. Such computer programs may also be received via network interface 2350, serial port interface 2342, or any other interface type. Such computer programs, when executed or loaded by an application, enable computing device 2300 to implement features of embodiments discussed herein. Accordingly, such computer programs represent controllers of the computing device 2300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In a first embodiment, a method in a computing device for visualizing results of a workflow run comprises: rendering a visual representation of a workflow by displaying each workflow step of the workflow in sequence in a graphical user interface (GUI) of a workflow designer; transitioning one or more workflow steps of the workflow from a development mode to a test mode in the GUI; executing a test workflow run on the one or more workflow steps transitioned to the test mode using input parameters applied to the one or more workflow steps; and displaying in the visual representation, for each of the one or more workflow steps transitioned to the test mode, parameter values for at least one input used and at least one output parameter generated during the test workflow run.

In an embodiment, a parameter value for an input parameter used during the test workflow run is automatically determined.

In an embodiment, the method further comprises: enabling a user to display a history of runs of the workflow, the history of runs comprising the test workflow run; enabling a user to select a workflow run from the history; and upon receiving a selection for a particular workflow run from the history, rendering a visual representation of the particular workflow run by displaying a workflow associated with the particular workflow run including each workflow step of the associated workflow in sequence, and displaying for each workflow step of the associated workflow in the visual representation parameter values for each input and output parameter generated during the particular workflow run of the associated workflow.

In an embodiment, the displaying for each workflow step of the associated workflow in the visual representation parameter values for each input and output parameter generating during the particular workflow run of the associated workflow comprises: for each workflow step of the associated workflow, retrieving the parameter values for each input and output parameter from a repository of parameter values; and displaying for each workflow step of the associated workflow in the visual representation the retrieved parameter values.

In an embodiment, the method further comprises: displaying for each workflow step of the associated workflow in the visual representation at least one of a time at which the workflow step was executed and an execution duration for the workflow step.

In another embodiment, a system in a computing device for visualizing results of a workflow run comprises: at least one processor circuit; and at least one memory that stores program code configured to be executed by the at least one processor circuit, the program code comprising: a user interface generator configured to: render a visual representation of a workflow by displaying each workflow step of the workflow in sequence in a graphical user interface (GUI) of a workflow designer; and a workflow tester configured to: transition one or more workflow steps of the workflow from a development mode to a test mode in the GUI; and execute a test workflow run on the one or more workflow steps transitioned to the test mode using input parameters applied to the one or more workflow steps, wherein the user interface generator is further configured to display in the visual representation, for each of the one or more workflow steps transitioned to the test mode, parameter values for at least one input used and at least one output parameter generated during the test workflow run.

In an embodiment, a parameter value for an input parameter used during the test workflow run is automatically determined In an embodiment, the program code further comprises a test results analyzer configured to: enable a user to display a history of runs of the workflow, the history of runs comprising the test workflow run; enable a user to select a workflow run from the history; and upon receiving a selection for a particular workflow run from the history, render a visual representation of the particular workflow run by displaying a workflow associated with the particular workflow run including each workflow step of the associated workflow in sequence, and display for each workflow step of the associated workflow in the visual representation parameter values for each input and output parameter generated during the particular workflow run of the associated workflow.

In an embodiment, the test results analyzer is configured to display for each workflow step of the associated workflow in the visual representation parameter values for each input and output parameter generated during the particular workflow run of the associated workflow by: for each workflow step of the associated workflow, retrieving the parameter values for each input and output parameter from a repository of parameter values; and displaying for each workflow step of the associated workflow in the visual representation the retrieved parameter values.

In an embodiment, the test results analyzer is configured to: display for each workflow step of the associated workflow in the visual representation at least one of a time at which the workflow step was executed and an execution duration for the workflow step.

In another embodiment, a method in a computing device for developing a workflow comprises: receiving a selection of workflow steps by a user for inclusion in a workflow at a first workflow development application, the workflow steps selected from a workflow library that stores program code defining each of the workflow steps; rendering a visual representation of the workflow that includes the selected workflow steps in a graphical user interface (GUI) displayed by a display screen of the computing device, the GUI generated by the first workflow development application, the GUI displaying the visual representation of the workflow showing controls representative of parameters of the workflow steps without displaying the program code defining the workflow steps; saving the workflow to generate saved workflow logic containing program code that defines the workflow; loading the saved workflow logic in a second workflow development application capable of displaying and editing the program code defining the workflow to generate a software application that comprises different functionality than the workflow.

In an embodiment, the saving the workflow to generate saved workflow logic containing program code that defines the workflow comprises: saving each workflow step of the workflow in the form of a workflow definition information file and an interface definition information file, the interface definition information file defining input and output parameters of the workflow step, and the workflow definition information file defining parameter values for input and output parameters of the workflow step.

In an embodiment, the second workflow development application is further configured to enable a user to edit the workflow definition information file and the interface definition information file of the workflow.

In an embodiment, the first workflow develop application is a workflow designer and the second workflow development application is a source code editor.

In an embodiment, the associating the software application with one or more first users that are different than a second user associated with the workflow.

In another embodiment, a system for developing a workflow comprises: at least one processor circuit; and at least one memory that stores program code configured to be executed by the at least one processor circuit, the program code comprising: a first workflow development application configured to: receive a selection of workflow steps by a user for inclusion in a workflow, the workflow steps selected from a workflow library that stores program code defining each of the workflow steps, render a visual representation of the workflow that includes the selected workflow steps in a graphical user interface (GUI) displayed by a display screen of the computing device, the GUI displaying the visual representation of the workflow showing controls representative of parameters of the workflow steps without displaying the program code defining the workflow steps, and save the workflow to generate saved workflow logic containing program code that defines the workflow; and a second workflow development application configured to: load the saved workflow logic, and display and edit the program code of the saved workflow logic defining the workflow to generate a software application that comprises different functionality that the workflow.

In an embodiment, the first workflow development application is configured to: save each workflow step in the workflow library in the form of a workflow definition information file and an interface definition information file, the interface definition information file defining input and output parameters of the workflow step, and the workflow definition information file defining parameter values for input and output parameters of the workflow step.

In an embodiment, the second workflow development application is further configured to enable a user to edit the workflow definition information file and the interface definition information file of the workflow.

In an embodiment, the first workflow develop application is a workflow designer and the second workflow development application is a source code editor.

In an embodiment, the second workflow development application is further configured to associate the software application with one or more first users that are different than a second user associated with the workflow.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device for visualizing results of a workflow run, comprising:
rendering a visual representation of a workflow by displaying each workflow step of the workflow in sequence in a graphical user interface (GUI) of a workflow designer;
transitioning one or more workflow steps of the workflow from a development mode to a test mode in the GUI;
executing a test workflow run on the one or more workflow steps transitioned to the test mode using input parameters applied to the one or more workflow steps; and
displaying in the visual representation, for each of the one or more workflow steps transitioned to the test mode, parameter values for at least one input used and at least one output parameter generated during the test workflow run.

2. The method of claim 1, wherein a parameter value for an input parameter used during the test workflow run is automatically determined.

3. The method of claim 1, further comprising:
enabling a user to display a history of runs of the workflow, the history of runs comprising the test workflow run;
enabling a user to select a workflow run from the history; and
upon receiving a selection for a particular workflow run from the history, rendering a visual representation of the particular workflow run by displaying a workflow associated with the particular workflow run including each workflow step of the associated workflow in sequence, and displaying for each workflow step of the associated workflow in the visual representation parameter values for each input and output parameter generated during the particular workflow run of the associated workflow.

4. The method of claim 3, wherein said displaying for each workflow step of the associated workflow in the visual representation parameter values for each input and output parameter generating during the particular workflow run of the associated workflow comprises:
for each workflow step of the associated workflow, retrieving the parameter values for each input and output parameter from a repository of parameter values; and
displaying for each workflow step of the associated workflow in the visual representation the retrieved parameter values.

5. The method of claim 3, further comprising:
displaying for each workflow step of the associated workflow in the visual representation at least one of a time at which the workflow step was executed and an execution duration for the workflow step.

6. A system in a computing device for visualizing results of a workflow run, comprising:
at least one processor circuit; and
at least one memory that stores program code configured to be executed by the at least one processor circuit, the program code comprising:
a user interface generator configured to:
render a visual representation of a workflow by displaying each workflow step of the workflow in sequence in a graphical user interface (GUI) of a workflow designer; and
a workflow tester configured to:
transition one or more workflow steps of the workflow from a development mode to a test mode in the GUI; and
execute a test workflow run on the one or more workflow steps transitioned to the test mode using input parameters applied to the one or more workflow steps,
wherein the user interface generator is further configured to display in the visual representation, for each of the one or more workflow steps transitioned to the test mode, parameter values for at least one input used and at least one output parameter generated during the test workflow run.

7. The system of claim 6, wherein a parameter value for an input parameter used during the test workflow run is automatically determined.

8. The system of claim 6, wherein the program code further comprises a test results analyzer configured to:
enable a user to display a history of runs of the workflow, the history of runs comprising the test workflow run;
enable a user to select a workflow run from the history; and
upon receiving a selection for a particular workflow run from the history, render a visual representation of the particular workflow run by displaying a workflow associated with the particular workflow run including each workflow step of the associated workflow in sequence, and display for each workflow step of the associated workflow in the visual representation parameter values for each input and output parameter generated during the particular workflow run of the associated workflow.

9. The system of claim 8, wherein the test results analyzer is configured to display for each workflow step of the associated workflow in the visual representation parameter values for each input and output parameter generated during the particular workflow run of the associated workflow by:
for each workflow step of the associated workflow, retrieving the parameter values for each input and output parameter from a repository of parameter values; and
displaying for each workflow step of the associated workflow in the visual representation the retrieved parameter values.

10. The system of claim 8, wherein the test results analyzer is configured to:
display for each workflow step of the associated workflow in the visual representation at least one of a time at which the workflow step was executed and an execution duration for the workflow step.

11. A method in a computing device for developing a workflow, comprising:
receiving a selection of workflow steps by a user for inclusion in a workflow at a first workflow development application, the workflow steps selected from a workflow library that stores program code defining each of the workflow steps;
rendering a visual representation of the workflow that includes the selected workflow steps in a graphical user interface (GUI) displayed by a display screen of the computing device, the GUI generated by the first workflow development application, the GUI displaying the visual representation of the workflow showing controls representative of parameters of the workflow steps without displaying the program code defining the workflow steps;

saving the workflow to generate saved workflow logic containing program code that defines the workflow;

loading the saved workflow logic in a second workflow development application capable of displaying and editing the program code defining the workflow to generate a software application that comprises different functionality than the workflow.

12. The method of claim 11, wherein said saving the workflow to generate saved workflow logic containing program code that defines the workflow comprises:

saving each workflow step of the workflow in the form of a workflow definition information file and an interface definition information file, the interface definition information file defining input and output parameters of the workflow step, and the workflow definition information file defining parameter values for input and output parameters of the workflow step.

13. The method of claim 12, wherein the second workflow development application is further configured to enable a user to edit the workflow definition information file and the interface definition information file of the workflow.

14. The method of claim 11, wherein the first workflow develop application is a workflow designer and the second workflow development application is a source code editor.

15. The method of claim 11, associating the software application with one or more first users that are different than a second user associated with the workflow.

16. A system for developing a workflow, comprising:

at least one processor circuit; and at least one memory that stores program code configured to be executed by the at least one processor circuit, the program code comprising:

a first workflow development application configured to:
receive a selection of workflow steps by a user for inclusion in a workflow, the workflow steps selected from a workflow library that stores program code defining each of the workflow steps,
render a visual representation of the workflow that includes the selected workflow steps in a graphical user interface (GUI) displayed by a display screen of the computing device, the GUI displaying the visual representation of the workflow showing controls representative of parameters of the workflow steps without displaying the program code defining the workflow steps, and
save the workflow to generate saved workflow logic containing program code that defines the workflow; and a second workflow development application configured to:
load the saved workflow logic, and
display and edit the program code of the saved workflow logic defining the workflow to generate a software application that comprises different functionality than the workflow.

17. The system of claim 16, wherein the first workflow development application is configured to:
save each workflow step in the workflow library in the form of a workflow definition information file and an interface definition information file, the interface definition information file defining input and output parameters of the workflow step, and the workflow definition information file defining parameter values for input and output parameters of the workflow step.

18. The system of claim 17, wherein the second workflow development application is further configured to enable a user to edit the workflow definition information file and the interface definition information file of the workflow.

19. The system of claim 16, wherein the first workflow develop application is a workflow designer and the second workflow development application is a source code editor.

20. The system of claim 16, wherein the second workflow development application is further configured to associate the software application with one or more first users that are different than a second user associated with the workflow.

* * * * *